(12) United States Patent
Deshpande

(10) Patent No.: US 10,051,311 B2
(45) Date of Patent: Aug. 14, 2018

(54) ELECTRONIC DEVICES FOR SIGNALING SUB-PICTURE BASED HYPOTHETICAL REFERENCE DECODER PARAMETERS

(71) Applicant: SHARP KABUSHIKI KAISHA, Osaka-shi, Osaka (JP)

(72) Inventor: Sachin G. Deshpande, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 415 days.

(21) Appl. No.: 14/411,822

(22) PCT Filed: Jul. 5, 2013

(86) PCT No.: PCT/JP2013/004201
§ 371 (c)(1),
(2) Date: Dec. 29, 2014

(87) PCT Pub. No.: WO2014/006921
PCT Pub. Date: Jan. 9, 2014

(65) Prior Publication Data
US 2015/0150069 A1    May 28, 2015

Related U.S. Application Data

(60) Provisional application No. 61/668,921, filed on Jul. 6, 2012, provisional application No. 61/700,255, filed (Continued)

(51) Int. Cl.
*H04N 21/43* (2011.01)
*H04N 19/70* (2014.01)
(Continued)

(52) U.S. Cl.
CPC ....... *H04N 21/4305* (2013.01); *H04N 19/423* (2014.11); *H04N 19/44* (2014.11);
(Continued)

(58) Field of Classification Search
None
See application file for complete search history.

(56) References Cited

U.S. PATENT DOCUMENTS 8,503,541 B2 *   8/2013   Narasimhan ....... H04N 21/2368
                                                       375/240.01
2014/0086336 A1 * 3/2014   Wang ..................... H04N 19/70
                                                       375/240.26
(Continued)

OTHER PUBLICATIONS

EPO, European Search Opinion for Application EP 13 812 881.4 (dated Feb. 3, 2016).*
(Continued)

*Primary Examiner* — David N Werner
(74) *Attorney, Agent, or Firm* — Birch, Stewart, Kolasch & Birch, LLP

(57) ABSTRACT

An electronic device for sending a message is described. The electronic device includes a processor and instructions stored in memory that is in electronic communication with the processor. The electronic device determines whether to include a common decoding unit CPB removal delay parameter in a picture timing Supplemental Enhancement Information (SEI) message. The electronic device also generates either a common decoding unit CPB removal delay parameter or a separate decoding unit CPB removal delay parameter for each decoding unit in the access unit. The electronic device also sends the picture timing SEI message with the common decoding unit CPB removal delay parameter or the decoding unit CPB removal delay parameters.

4 Claims, 10 Drawing Sheets

Related U.S. Application Data on Sep. 12, 2012, provisional application No. 61/749,834, filed on Jan. 7, 2013.

(51) Int. Cl.

| | | |
|---|---|---|
| *H04N 19/423* | (2014.01) | |
| *H04N 19/44* | (2014.01) | |
| *H04N 21/44* | (2011.01) | |
| *H04N 21/434* | (2011.01) | |
| *H04N 19/61* | (2014.01) | |

(52) U.S. Cl.
CPC ......... *H04N 19/70* (2014.11); *H04N 21/4302* (2013.01); *H04N 21/44004* (2013.01); *H04N 19/61* (2014.11); *H04N 21/4345* (2013.01)

(56) References Cited

U.S. PATENT DOCUMENTS

2014/0086344 A1\* 3/2014 Wang .................. H04N 19/70
 375/240.28
2014/0092992 A1\* 4/2014 Sullivan ............... H04N 19/172
 375/240.26

OTHER PUBLICATIONS

JCT-VC Document Register for Stockholm Meeting (Jul. 2012).\*
Bross et al., "High efficiency video coding (HEVC) text specification draft 7", Joint Collaborative Team on Video Coding (JCT-VC) of ITU-T SG16 WP3 and ISO/IEC JTC1/SC29/WG11, Document: JCTVC-I1003_d9, 9th Meeting: Geneva, CH, Apr. 27-May 7, 2012, 278 pages.
Kazui et al., "AHG11: Proposed text for sub-picture based CPB operation", Joint Collaborative Team on Video Coding (JCT-VC) of ITU-T SG 16 WP 3 and ISO/IEC JTC 1/SC 29/WG 11, Document: JCTVC-I0333, 9th Meeting: Geneva, CH, Apr. 27-May 7, 2012, pp. 1-2.
Deshpande S, et al. "Sub-picture Based CPB Removal Timing", 101. MPEG Meeting Jul. 16-20, 2012; Stockholm; (Motion Picture Expert Group or ISO/IEC JTC1/SC29/WG11), XP030054627.
Extended European Search Report dated Feb. 3, 2016 in corresponding European Application No. 13812881.4.
Kazui K. et al., "AHG9: Improvement of HRD for sub-picture based operation", 10. JCT-VC Meeting; 101. MPEG Meeting; Jul. 11-20, 2012; Stockholm; (Joint Collaborative Team on Video Coding of ISO/IEC JTC1/SC29/WG11 and ITU-T SG. 16), JCTVC-J0136, XP030112498.

\* cited by examiner

ELECTRONIC DEVICES FOR SIGNALING SUB-PICTURE BASED HYPOTHETICAL REFERENCE DECODER PARAMETERS

CROSS REFERENCE TO RELATED APPLICATIONS

This application is the National Phase of PCT/JP2013/004201 filed on Jul. 5, 2013, which claims priority under 35 U.S.C. 119(e) to U.S. Provisional Application No. 61/668,921 filed on Jul. 6, 2012, to U.S. Provisional Application No. 61/700,255 filed on Sep. 12, 2012 and to U.S. Provisional Application No. 61/749,834 filed on Jan. 7, 2013, all of which are hereby expressly incorporated by reference into the present application.

TECHNICAL FIELD

The present disclosure relates generally to electronic devices. More specifically, the present disclosure relates to electronic devices for signaling sub-picture based hypothetical reference decoder parameters.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

SUMMARY OF INVENTION

Technical Problem

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

Solution to Problem

According to the present invention, there is provided an electronic device for buffering a bitstream, comprising: determining a picture timing SEI (Supplemental Enhancement Information) message to remove data; determining an access unit CPB (Coded Picture Buffer) removal delay parameter for removing an access unit from the CPB in the picture timing SEI message; and determining one or more decoding unit CPB removal delays for each decoding unit in the access unit; wherein the sum of the decoding unit CPB removal delays is equal to the access unit CPB removal delay parameter.

According to the present invention, there is provided an electronic device for sending a message, comprising: a processor; memory in electronic communication with the processor; instructions stored in the memory, the instructions being executable to: determine, when a Coded Picture Buffer (CPB) supports operation on a sub-picture level, whether to include a common decoding unit CPB removal delay parameter in a picture timing Supplemental Enhancement Information (SEI) message; generate, when the common decoding unit CPB removal delay parameter is to be included in the picture timing SEI message, the common decoding unit CPB removal delay parameter, wherein the common decoding unit CPB removal delay parameter is applicable to all decoding units in an access unit from the CPB; generate, when the common decoding unit CPB removal delay parameter is not to be included in the picture timing SEI message, a separate decoding unit CPB removal delay parameter for each decoding unit in the access unit; and send the picture timing SEI message with the common decoding unit CPB removal delay parameter or the decoding unit CPB removal delay parameters.

According to the present invention, there is provided an electronic device for buffering a bitstream, comprising: a processor; memory in electronic communication with the processor; instructions stored in the memory, the instructions being executable to: determine that a CPB signals parameters on a sub-picture level for an access unit; determine, when a received picture timing Supplemental Enhancement Information (SEI) message comprises the common decoding unit Coded Picture Buffer (CPB) removal delay flag, a common decoding unit CPB removal delay parameter applicable to all decoding units in the access unit; determine, when the picture timing SEI message does not comprise the common decoding unit CPB removal delay flag, a separate decoding unit CPB removal delay parameter for each decoding unit in the access unit; remove decoding units from the CPB using the common decoding unit CPB removal delay parameter or the separate decoding unit CPB removal delay parameters; and decode the decoding units in the access unit.

According to the present invention, there is provided a method for sending a message, comprising: determining, when a Coded Picture Buffer (CPB) supports operation on a sub-picture level, whether to include a common decoding unit CPB removal delay parameter in a picture timing Supplemental Enhancement Information (SEI) message; generating, when the common decoding unit CPB removal delay parameter is to be included in the picture timing SEI message, the common decoding unit CPB removal delay parameter, wherein the common decoding unit CPB removal delay parameter is applicable to all decoding units in an access unit from the CPB; generating, when the common decoding unit CPB removal delay parameter is not to be included in the picture timing SEI message, a separate decoding unit CPB removal delay parameter for each decoding unit in the access unit; and sending the picture timing SEI message with the common decoding unit CPB removal delay parameter or the decoding unit CPB removal delay parameters.

DESCRIPTION OF EMBODIMENTS

Figure 1:
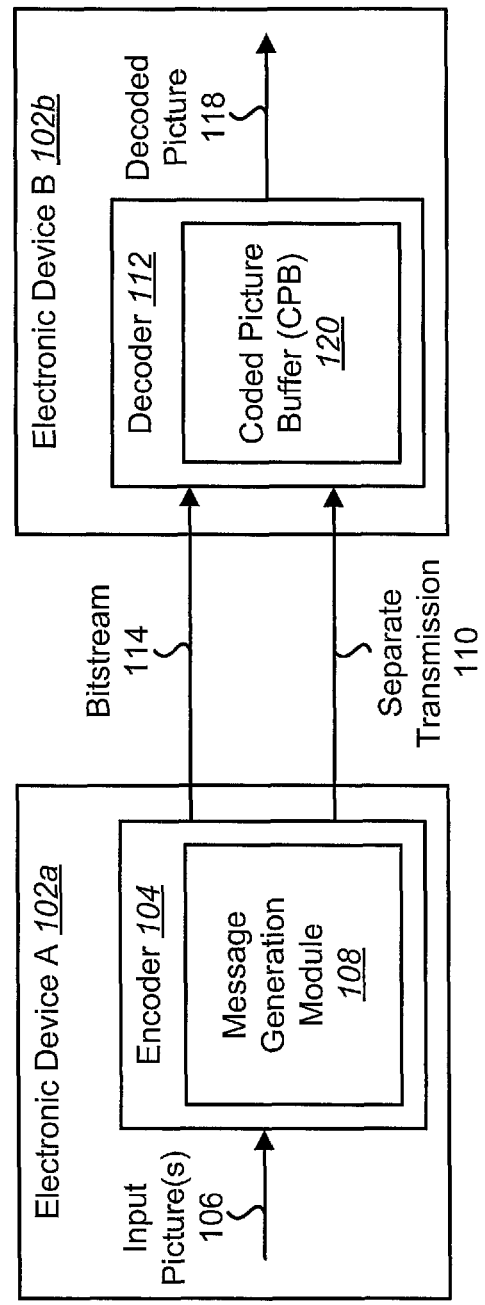
FIG. 1 is a block diagram illustrating an example of one or more electronic devices in which systems and methods for sending a message and buffering a bitstream may be implemented.

An electronic device for sending a message is described. The electronic device includes a processor and instructions stored in memory that is in electronic communication with the processor. The electronic device determines, when a Coded Picture Buffer (CPB) supports operation on a sub-picture level, whether to include a common decoding unit CPB removal delay parameter in a picture timing Supplemental Enhancement Information (SEI) message. The electronic device also generates, when the common decoding unit CPB removal delay parameter is to be included in the picture timing SEI message (or some other SEI message or some other parameter set e.g. picture parameter set or sequence parameter set or video parameter set or adaptation parameter set), the common decoding unit CPB removal delay parameter, wherein the common decoding unit CPB removal delay parameter is applicable to all decoding units in an access unit from the CPB. The electronic device also generates, when the common decoding unit CPB removal delay parameter is not to be included in the picture timing SEI message, a separate decoding unit CPB removal delay parameter for each decoding unit in the access unit. The electronic device also sends the picture timing SEI message with the common decoding unit CPB removal delay parameter or the decoding unit CPB removal delay parameters.

The common decoding unit CPB removal delay parameter may specify an amount of sub-picture clock ticks to wait after removal from the CPB of a immediately preceding decoding unit before removing from the CPB a current decoding unit in the access unit associated with the picture timing SEI message.

Furthermore, when a decoding unit is a first decoding unit in an access unit, the common decoding unit CPB removal delay parameter may specify an amount of sub-picture clock ticks to wait after removal from the CPB of a last decoding unit in an access unit associated with a most recent buffering period SEI message in a preceding access unit before removing from the CPB the first decoding unit in the access unit associated with the picture timing SEI message.

In contrast, when the decoding unit is a non-first decoding unit in an access unit, the common decoding unit CPB removal delay parameter may specify an amount of sub-picture clock ticks to wait after removal from the CPB of a preceding decoding unit in the access unit associated with the picture timing SEI message before removing from the CPB a current decoding unit in the access unit associated with the picture timing SEI message.

The decoding unit CPB removal delay parameters may specify an amount of sub-picture clock ticks to wait after removal from the CPB of the last decoding unit before removing from the CPB an i-th decoding unit in the access unit associated with the picture timing SEI message.

The electronic device may calculate the decoding unit CPB removal delay parameters according to a remainder of a modulo $2^{(cpb\_removal\_delay\_length\_minus1+1)}$ counter where cpb_removal_delay_length_minus1+1 is a length of a common decoding unit CPB removal delay parameter.

The electronic device may also generate, when the CPB supports operation on an access unit level, a picture timing SEI message including a CPB removal delay parameter that specifies how many clock ticks to wait after removal from the CPB of an access unit associated with a most recent buffering period SEI message in a preceding access unit before removing from the CPB the access unit data associated with the picture timing SEI message.

The electronic device may also determine whether the CPB supports operation on a sub-picture level or an access unit level. This may include determining a picture timing flag that indicates whether a Coded Picture Buffer (CPB) provides parameters supporting operation on a sub-picture level based on a value of the picture timing flag. The picture timing flag may be included in the picture timing SEI message.

Determining whether to include a common decoding unit CPB removal delay parameter may include setting a common decoding unit CPB removal delay flag to 1 when the common decoding unit CPB removal delay parameter is to be included in the picture timing SEI message. It may also include setting the common decoding unit CPB removal delay flag to 0 when the common decoding unit CPB removal delay parameter is not to be included in the picture timing SEI message. The common decoding unit CPB removal delay flag may be included in the picture timing SEI message.

The electronic device may also generate, when the CPB supports operation on a sub-picture level, separate network abstraction layer (NAL) units related parameters that indicate an amount, offset by one, of NAL units for each decoding unit in an access unit. Alternatively, or in addition to, the electronic device may generate a common NAL parameter that indicates an amount, offset by one, of NAL units common to each decoding unit in an access unit.

An electronic device for buffering a bitstream is also described. The electronic device includes a processor and instructions stored in memory that is in electronic communication with the processor. The electronic device determines that a CPB signals parameters on a sub-picture level for an access unit. The electronic device also determines, when a received picture timing Supplemental Enhancement Information (SEI) message comprises the common decoding unit Coded Picture Buffer (CPB) removal delay flag, a common decoding unit CPB removal delay parameter applicable to all decoding units in the access unit. The electronic device also determines, when the picture timing SEI message does not comprise the common decoding unit CPB removal delay flag, a separate decoding unit CPB removal delay parameter for each decoding unit in the access unit. The electronic device also removes decoding units from the CPB using the common decoding unit CPB removal delay parameter or the separate decoding unit CPB removal delay parameters. The electronic device also decodes the decoding units in the access unit.

In one configuration, the electronic device determines that a picture timing flag is set in the picture timing SEI message. The electronic device may also set a CPB removal delay parameter, cpb_removal_delay, according to $$\text{cpb\_removal\_delay} = \frac{\left(\sum_{i=0}^{num\_decoding\_units\_minus1} \text{du\_cpb\_removal\_delay}[i]\right) * t_{c,sub}}{t_c}$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, the electronic device may set a CPB removal delay parameter, cpb_removal_delay, and du_cpb_removal_delay[num_decoding_units_minus1] so as to satisfy the equation $$-1 \leq \left[\text{cpb\_removal\_delay} * t_c - \left(\sum_{i=0}^{num\_decoding\_units\_minus1} \text{du\_cpb\_removal\_delay}[i]\right) * t_{c,sub}\right] \leq 1$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, the electronic device may set a CPB removal delay parameter, cpb_removal_delay, and du_cpb_removal_delay[num_decoding_units_minus1] according to cpb_removal_delay*$t_c$=du_cpb_removal_delay[num_decoding_units_minus1]*$t_{c\_sub}$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick num_decoding_units_minus1 is an amount of decoding units in the access unit offset by one.

In one configuration, the electronic device determines that a picture timing flag is set in the picture timing SEI message. The electronic device may also set CPB removal delay parameters, cpb_removal_delay, and du_cpb_removal_delay[num_decoding_units_minus1] so as to satisfy the equation: $-1 <= (\text{cpb\_removal\_delay}*t_c - \text{du\_cpb\_removal\_delay}[num\_decoding\_units\_minus1]*t_{c,sub}) <= 1$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick num_decoding_units_minus1 is an amount of decoding units in the access unit offset by one.

A ClockDiff variable may be defined as ClockDiff=(num_units_in_tick−(num_units_in_sub_tick*(num_decoding_units_minus1+1))/time_scale) where num_units_in_tick is number of time units of a clock operating at the frequency time_scale Hz that corresponds to one increment of a clock tick counter, num_units_in_sub_tick is number of time units of a clock operating at the frequency time_scale Hz that corresponds to one increment of a sub-picture clock tick counter, num_decoding_units_minus1+1 is an amount of decoding units in the access unit, and time_scale is the number of time units that pass in one second.

When a low delay hypothetical reference decoder (HRD) flag (e.g., low_delay_hrd_flag) is set to 1, $t_{r,n}(m)<t_{af}(m)$, a picture timing flag is set to 1, the CPB is operating at sub-picture level and ClockDiff is greater than zero, the removal time for decoding unit m, $t_r(m)$ is determined according to: $t_r(m)=t_{r,n}(m)+t_{c\_sub}*\text{Ceil}((t_{af}(m)-t_{r,n}(m))/t_{c\_sub})+\text{ClockDiff}$ where $t_{r,n}(m)$ is the nominal removal time of the decoding unit m, $t_{c\_sub}$ is a sub-picture clock tick, Ceil( ) is a ceiling function and $t_{af}(m)$ is final arrival time of decoding unit m.

When a low delay hypothetical reference decoder (HRD) flag (e.g., low_delay_hrd_flag) is set to 1, $t_{r,n}(n)<t_{af}(n)$, a picture timing flag is set to 1, the CPB is operating at an access unit level and ClockDiff is greater than zero, the removal time for access unit n, $t_r(n)$ is determined according to: $t_r(n)=t_{r,n}(n)+t_c*\text{Ceil}((t_{af}(n)-t_{r,n}(n))/t_c)-\text{ClockDiff}$, where $t_{r,n}(n)$ is the nominal removal time of the access unit n, $t_c$ is a clock tick, Ceil( ) is a ceiling function and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\max((t_{c\_sub}*\text{Ceil}((t_{af}(m)-t_{r,n}(m))/t_{c\_sub})), (t_c*\text{Ceil}((t_{af}(n)-t_{r,n}(n))/tc)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\max((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\min((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\min$ $((t_{c\_sub} * \text{Ceil}((t_{af}(m) - t_{r,n}(m))/t_{c\_sub}))$, $(t_c * \text{Ceil}((t_{af}(n) - t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m) < t_{af}(m)$, a picture timing flag is set to 1 and the CPB is operating at sub-picture level, the removal time for the last decoding unit m of access unit, tr(m) according to: $t_r(m) = t_{r,n}(m) + (t_c * \text{Ceil}((t_{af}(n) - t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n) < t_{af}(n)$, a picture timing flag is set to 1 and the CPB is operating at access unit level, the removal time for access unit n, tr(n) according to: $t_r(n) = t_{r,n}(n) + (t_c * \text{Ceil}((t_{af}(n) - t_{r,n}(n))/t_c))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m) < t_{af}(m)$, a picture timing flag is set to 1 and the CPB is operating at sub-picture level, the removal time for a decoding unit m which is not the last decoding unit is set as $t_r(m) = t_{af}(m)$, where $t_{af}(m)$ is a final arrival time of decoding unit m. When a low delay hypothetical reference decoder (HRD) flag (e.g., low_delay_hrd_flag) is set to 1, $t_{r,n}(m) < t_{af}(m)$, a picture timing flag is set to 1 and the CPB is operating at sub-picture level, the removal time for a decoding unit m which is the last decoding unit m of access unit, $t_r(m)$ according to: $t_r(m) = t_{r,n}(m) + (t_{c\_sub} * \text{Ceil}((t_{af}(m) - t_{r,n}(m))/t_{c\_sub}))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick, $t_{af}(n)$ is a final arrival time of access unit n, and $t_{af}(m)$ is a final arrival time of last decoding unit m in the access unit n.

When a low delay hypothetical reference decoder (HRD) flag (e.g., low_delay_hrd_flag) is set to 1, $t_{r,n}(m) < t_{af}(m)$, a picture timing flag is set to 1 and the CPB is operating at sub-picture level, the removal time for a decoding unit m which is not the last decoding unit is set as $t_r(m) = t_{af}(m)$, where $t_{af}(m)$ is a final arrival time of decoding unit m. When a low delay hypothetical reference decoder (HRD) flag (e.g., low_delay_hrd_flag) is set to 1, $t_{r,n}(m) < t_{af}(m)$, a picture timing flag is set to 1 and the CPB is operating at sub-picture level, the removal time for a decoding unit m which is the last decoding unit m of access unit, $t_r(m)$ according to: $t_r(m) = t_{r,n}(m) + (t_c * \text{Ceil}((t_{af}(m) - t_{r,n}(m))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick, $t_{af}(n)$ is a final arrival time of access unit n, and $t_{af}(m)$ is a final arrival time of last decoding unit m in the access unit n.

When a low delay hypothetical reference decoder (HRD) flag (e.g., low_delay_hrd_flag) is set to 1, $t_{r,n}(m) < t_{af}(m)$, a picture timing flag is set to 1 and the CPB is operating at sub-picture level, the removal time for a decoding unit m is set as $t_r(m) = t_{af}(m)$ where $t_{r,n}(m)$ is the nominal removal time of the decoding unit m, $t_{c\_sub}$ is sub-picture clock tick, Ceil( ) is a ceiling function, $t_{af}(m)$ is a final arrival time of decoding unit m, $t_{r,n}(n)$ is the nominal removal time of the access unit n, $t_c$ is clock tick, $t_{af}(n)$ is a final arrival time of access unit n, and $t_{af}(m)$ is a final arrival time of decoding unit m in the access unit n.

When a low delay hypothetical reference decoder (HRD) flag is set to 1, $t_{r,n}(n) < t_{af}(n)$, a picture timing flag is set to 1 and the CPB is operating at access unit level, the removal time for access unit n, $t_r(n)$ according to: $t_r(n) = t_{af}(n)$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Additionally in some cases a flag may be sent in part of the bitstream to signal which of the above alternative equations are used for deciding the removal time of the decoding units and removal time of the access unit. In one case the flag may be called du_au_cpb_alignment_mode_flag. If du_au_cpb_alignment_mode_flag is 1 then the equations above which align the operation of CPB which operates in sub-picture based mode with the CPB which operates in the access unit mode are used. If du_au_cpb_alignment_mode_flag is 0 then the equations above which do not align the operation of CPB which operates in sub-picture based mode with the CPB which operates in the access unit mode are used.

In once case the flag du_au_cpb_alignment_mode_flag may be signaled in the video usability information (VUI). In another case the flag du_au_cpb_alignment_mode_flag may be sent in picture timing SEI message. In yet another case the flag du_au_cpb_alignment_mode_flag may be sent in some other normative part of the bitstream. One example of modified syntax and semantics in accordance with the systems and methods disclosed herein is given in Table (0) as follows.

TABLE 0

```
pic_timing( payloadSize ) {
    if( CpbDpbDelaysPresentFlag ) {
        cpb_removal_delay
        dpb_output_delay
        if( sub_pic_cpb_params_present_flag ) {
            num_decoding_units_minus1
            du_au_cpb_alignment_mode_flag
            for( i = 0; i <= num_decoding_units_minus1; i++ ) {
                num_nalus_in_du_minus1[ i ]
                du_cpb_removal_delay[ i ]
            }
        }
    }
}
```

It should be noted that different symbols (names) than those used above for various variables may be used. For example $t_r(n)$ of access unit n may be called CpbRemovalTime(n), $t_r(m)$ of decoding unit n may be called CpbRemovalTime(m), $t_{c\_sub}$ may be called ClockSubTick, $t_c$ may be called ClockTick, $t_{af}(n)$ of access unit m may be called FinalArrivalTime(n) of access unit n, $t_{af}(m)$ of decoding unit m may be called FinalArrivalTime(m), $t_{r,n}(n)$ may be called NominalRemovalTime(n) of the access unit n, $t_{r,n}(m)$ may be called NominalRemovalTime(m) of the decoding unit m.

A method for sending a message by an electronic device is also described. The method includes determining, when a Coded Picture Buffer (CPB) supports operation on a sub-picture level, whether to include a common decoding unit CPB removal delay parameter in a picture timing Supplemental Enhancement Information (SEI) message. The method also includes generating, when the common decoding unit CPB removal delay parameter is to be included in the picture timing SEI message, the common decoding unit CPB removal delay parameter, wherein the common decoding unit CPB removal delay parameter is applicable to all decoding units in an access unit from the CPB. The method also includes generating, when the common decoding unit CPB removal delay parameter is not to be included in the picture timing SEI message, a separate decoding unit CPB removal delay parameter for each decoding unit in the access unit. The method also includes sending the picture timing SEI message with the common decoding unit CPB removal delay parameter or the decoding unit CPB removal delay parameters.

A method for buffering a bitstream by an electronic device is also described. The method includes determining that a CPB signals parameters on a sub-picture level for an access unit. The method also includes determining, when a received picture timing Supplemental Enhancement Information (SEI) message comprises the common decoding unit Coded Picture Buffer (CPB) removal delay flag, a common decoding unit CPB removal delay parameter applicable to all decoding units in the access unit. The method also includes determining, when the picture timing SEI message does not comprise the common decoding unit CPB removal delay flag, a separate decoding unit CPB removal delay parameter for each decoding unit in the access unit. The method also includes removing decoding units from the CPB using the common decoding unit CPB removal delay parameter or the separate decoding unit CPB removal delay parameters. The method also includes decoding the decoding units in the access unit.

The systems and methods disclosed herein describe electronic devices for sending a message and buffering a bitstream. For example, the systems and methods disclosed herein describe buffering for bitstreams starting with sub-picture parameters. In some configurations, the systems and methods disclosed herein may describe signaling sub-picture based Hypothetical Reference Decoder (HRD) parameters. For instance, the systems and methods disclosed herein describe modification to a picture timing Supplemental Enhancement Information (SEI) message. The systems and methods disclosed herein (e.g., the HRD modification) may result in more compact signaling of parameters when each sub-picture arrives and is removed from CPB at regular intervals.

Furthermore, when the sub-picture level CPB removal delay parameters are present, the Coded Picture Buffer (CPB) may operate at access unit level or sub-picture level. The present systems and methods may also impose a bitstream constraint so that the sub-picture level based CPB operation and the access unit level CPB operation result in the same timing of decoding unit removal. Specifically the timing of removal of last decoding unit in an access unit when operating in sub-picture mode and the timing of removal of access unit when operating in access unit mode will be the same.

It should be noted that although the term "hypothetical" is used in reference to an HRD, the HRD may be physically implemented. For example, "HRD" may be used to describe an implementation of an actual decoder. In some configurations, an HRD may be implemented in order to determine whether a bitstream conforms to High Efficiency Video Coding (HEVC) specifications. For instance, an HRD may be used to determine whether Type I bitstreams and Type II bitstreams conform to HEVC specifications. A Type I bitstream may contain only Video Coding Layer (VCL) Network Access Layer (NAL) units and filler data NAL units. A Type II bitstream may contain additional other NAL units and syntax elements.

Joint Collaborative Team on Video Coding (JCTVC) document JCTVC-I0333 includes sub-picture based HRD and supports picture timing SEI messages. This functionality has been incorporated into the High Efficiency Video Coding (HEVC) Committee Draft (JCTVC-I1003).

One example of modified syntax and semantics in accordance with the systems and methods disclosed herein is given in Table (1) as follows. Modifications in accordance with the systems and methods disclosed herein are denoted in bold.

TABLE 1

```
pic_timing( payloadSize ) {
  if( CpbDpbDelaysPresentFlag ) {
    cpb_removal_delay
    dpb_output_delay
    if( sub_pic_cpb_params_present_flag ) {
      num_decoding_units_minus1
      common_du_cpb_removal_delay_flag
      if(common_du_cpb_removal_delay_flag) {
        common_du_cpb_removal_delay
      }
      for( i = 0; i <= num_decoding_units_minus1; i++ ) {
        num_nalus_in_du_minus1 [ i ]
        if(!common_du_cpb_removal_delay_flag)
          du_cpb_removal_delay[ i ]
      }
    }
  }
}
```

Examples regarding buffering period SEI message semantics in accordance with the systems and methods disclosed herein are given as follows. In particular, additional detail regarding the semantics of the modified syntax elements are given as follows. When NalHrdBpPresentFlag or VclHrdBpPresentFlag are equal to 1, a buffering period SEI message can be associated with any access unit in the bitstream, and a buffering period SEI message may be associated with each Instantaneous Decoding Refresh (IDR) access unit, with each Clean Random Access (CRA) access unit, and with each access unit associated with a recovery point SEI message. For some applications, the frequent presence of a buffering period SEI message may be desirable. A buffering period is specified as the set of access units between two instances of the buffering period SEI message in decoding order.

seq_parameter_set_id specifies the sequence parameter set that contains the sequence HRD attributes. The value of seq_parameter_set_id may be equal to the value of seq_parameter_set_id in the picture parameter set referenced by the primary coded picture associated with the buffering period SEI message. The value of seq_parameter_set_id may be in the range of 0 to 31, inclusive.

initial_cpb_removal_delay[SchedSelIdx] specifies the delay for the SchedSelIdx-th CPB between the time of arrival in the CPB of the first bit of the coded data associated with the access unit associated with the buffering period SEI message and the time of removal from the CPB of the coded data associated with the same access unit, for the first buffering period after HRD initialisation. The syntax element has a length in bits given by initial_cpb_removal_delay_length_minus1+1. It is in units of a 90 kHz clock. initial_cpb_removal_delay[SchedSelIdx] may not be equal to 0 and may not exceed 90000*(CpbSize[SchedSelIdx]/BitRate[SchedSelIdx]), the time-equivalent of the CPB size in 90 kHz clock units.

initial_cpb_removal_delay_offset[SchedSelIdx] is used for the SchedSelIdx-th CPB in combination with the cpb_removal_delay to specify the initial delivery time of coded access units to the CPB. initial_cpb_removal_delay_offset [SchedSelIdx] is in units of a 90 kHz clock. The initial_cpb_removal_delay_offset[SchedSelIdx] syntax element is a fixed length code whose length in bits is given by initial_cpb_removal_delay_length_minus1+1. This syntax element is not used by decoders and is needed only for the delivery scheduler (HSS) (e.g., as specified in Annex C of JCTVC-I1003).

Over the entire coded video sequence, the sum of initial_cpb_removal_delay[SchedSelIdx] and initial_cpb_removal_delay_offset[SchedSelIdx] may be constant for each value of SchedSelIdx.

initial_du_cpb_removal_delay[SchedSelIdx] specifies the delay for the SchedSelIdx-th CPB between the time of arrival in the CPB of the first bit of the coded data associated with the first decoding unit in the access unit associated with the buffering period SEI message and the time of removal from the CPB of the coded data associated with the same decoding unit, for the first buffering period after HRD initialization. The syntax element has a length in bits given by initial_cpb_removal_delay_length_minus1+1. It is in units of a 90 kHz clock. initial_du_cpb_removal_delay [SchedSelIdx] may not be equal to 0 and may not exceed 90000*(CpbSize[SchedSelIdx]/BitRate[SchedSelIdx]), the time-equivalent of the CPB size in 90 kHz clock units.

initial_du_cpb_removal_delay_offset[SchedSelIdx] is used for the SchedSelIdx-th CPB in combination with the cpb_removal_delay to specify the initial delivery time of decoding units to the CPB. initial_cpb_removal_delay_offset[SchedSelIdx] is in units of a 90 kHz clock. The initial_du_cpb_removal_delay_offset[SchedSelIdx] syntax element is a fixed length code whose length in bits is given by initial_cpb_removal_delay_length_minus1+1. This syntax element is not used by decoders and is needed only for the delivery scheduler (HSS) (e.g., as specified in Annex C of JCTVC-I1003).

Over the entire coded video sequence, the sum of initial_du_cpb_removal_delay[SchedSelIdx] and initial_du_cpb_removal_delay_offset[SchedSelIdx] may be constant for each value of SchedSelIdx.

Examples regarding picture timing SEI message semantics in accordance with the systems and methods disclosed herein are given as follows. In particular, additional detail regarding the semantics of the modified syntax elements are given as follows.

The syntax of the picture timing SEI message is dependent on the content of the sequence parameter set that is active for the coded picture associated with the picture timing SEI message. However, unless the picture timing SEI message of an Instantaneous Decoding Refresh (IDR) access unit is preceded by a buffering period SEI message within the same access unit, the activation of the associated sequence parameter set (and, for IDR pictures that are not the first picture in the bitstream, the determination that the coded picture is an IDR picture) does not occur until the decoding of the first coded slice Network Abstraction Layer (NAL) unit of the coded picture. Since the coded slice NAL unit of the coded picture follows the picture timing SEI message in NAL unit order, there may be cases in which it is necessary for a decoder to store the raw byte sequence payload (RBSP) containing the picture timing SEI message until determining the parameters of the sequence parameter that will be active for the coded picture, and then perform the parsing of the picture timing SEI message.

The presence of picture timing SEI message in the bitstream is specified as follows. If CpbDpbDelaysPresentFlag is equal to 1, one picture timing SEI message may be present in every access unit of the coded video sequence. Otherwise (CpbDpbDelaysPresentFlag is equal to 0), no picture timing SEI messages may be present in any access unit of the coded video sequence.

cpb_removal_delay specifies how many clock ticks (see subclause E.2.1 of JCTVC-I1003) to wait after removal from the CPB of the access unit associated with the most recent buffering period SEI message in a preceding access unit before removing from the buffer the access unit data associated with the picture timing SEI message. This value is also used to calculate an earliest possible time of arrival of access unit data into the CPB for the HSS, as specified in Annex C of JCTVC-I1003. The syntax element is a fixed length code whose length in bits is given by cpb_removal_delay_length_minus1+1. The cpb_removal_delay is the remainder of a modulo $2^{(cpb\_removal\_delay\_length\_minus1+1)}$ counter.

The value of cpb_removal_delay_length_minus1 that determines the length (in bits) of the syntax element cpb_removal_delay is the value of cpb_removal_delay_length_minus1 coded in the sequence parameter set that is active for the primary coded picture associated with the picture timing SEI message, although cpb_removal_delay specifies a number of clock ticks relative to the removal time of the preceding access unit containing a buffering period SEI message, which may be an access unit of a different coded video sequence.

dpb_output_delay is used to compute the Decoded Picture Buffer (DPB) output time of the picture. It specifies how many clock ticks to wait after removal of the last decoding unit in an access unit from the CPB before the decoded picture is output from the DPB (see subclause C.2 of JCTVC-I1003).

With respect to the DPB, a picture is not removed from the DPB at its output time when it is still marked as "used for short-term reference" or "used for long-term reference". Only one dpb_output_delay is specified for a decoded picture. The length of the syntax element dpb_output_delay is given in bits by dpb_output_delay_length_minus1+1. When max_dec_pic_buffering[max_temporal_layers_minus1] is equal to 0, dpb_output_delay may be equal to 0.

The output time derived from the dpb_output_delay of any picture that is output from an output timing conforming decoder as specified in subclause C.2 of JCTVC-I1003 may precede the output time derived from the dpb_output_delay of all pictures in any subsequent coded video sequence in decoding order. The picture output order established by the values of this syntax element may be the same order as established by the values of PicOrderCnt( ) as specified by subclause. For pictures that are not output by the "bumping" process of subclause because they precede, in decoding order, an IDR picture with no_output_of_prior_pics_flag equal to 1 or inferred to be equal to 1, the output times derived from dpb_output_delay may be increasing with increasing value of PicOrderCnt( ) relative to all pictures within the same coded video sequence.

num_decoding_units_minus1 plus 1 specifies the number of decoding units in the access unit the picture timing SEI message is associated with. The value of num_decoding_units_minus1 may be in the range of 0 to PicWidthInCtbs*PicHeightInCtbs−1, inclusive.

common_du_cpb_removal_delay_flag equal to 1 specifies that the syntax element common_du_cpb_removal_delay is present. common_du_cpb_removal_delay_flag equal to 0 specifies that the syntax element common_du_cpb_removal_delay is not present.

common_du_cpb_removal_delay specifies information as follows: If a decoding unit is the first decoding unit in the access unit associated with the picture timing SEI message then common_du_cpb_removal_delay specifies how many sub-picture clock ticks (see subclause E.2.1 of JCTVC-I1003) to wait after removal from the CPB of the last decoding unit in the access unit associated with the most recent buffering period SEI message in a preceding access unit before removing from the CPB the first decoding unit in the access unit associated with the picture timing SEI message.

Otherwise, common_du_cpb_removal_delay specifies how many sub-picture clock ticks (see subclause E.2.1 of JCTVC-I1003) to wait after removal from the CPB of the preceding decoding unit in the access unit associated with the picture timing SEI message before removing from the CPB the current decoding unit in the access unit associated with the picture timing SEI message. This value is also used to calculate an earliest possible time of arrival of decoding unit data into the CPB for the HSS, as specified in Annex C. The syntax element is a fixed length code whose length in bits is given by cpb_removal_delay_length_minus1+1. The common_du_cpb_removal_delay is the remainder of a modulo $2^{(cpb\_removal\_delay\_length\_minus1+1)}$ counter.

An alternate way of specifying common_du_cpb_removal_delay is as follows:

common_du_cpb_removal_delay specifies how many sub-picture clock ticks (see subclause E.2.1 of JCTVC-I1003) to wait after removal from the CPB of the last decoding unit before removing from the CPB the current decoding unit in the access unit associated with the picture timing SEI message. This value is also used to calculate an earliest possible time of arrival of decoding unit data into the CPB for the HSS, as specified in Annex C. The syntax element is a fixed length code whose length in bits is given by cpb_removal_delay_length_minus1+1. The common_du_cpb_removal_delay is the remainder of a modulo $2^{(cpb\_removal\_delay\_length\_minus1+1)}$ counter.

The value of cpb_removal_delay_length_minus1 that determines the length (in bits) of the syntax element common_du_cpb_removal_delay is the value of cpb_removal_delay_length_minus1 coded in the sequence parameter set that is active for the coded picture associated with the picture timing SEI message, although common_du_cpb_removal_delay specifies a number of sub-picture clock ticks relative to the removal time of the first decoding unit in the preceding access unit containing a buffering period SEI message, which may be an access unit of a different coded video sequence.

num_nalus_in_du_minus1[i] plus 1 specifies the number of NAL units in the i-th decoding unit of the access unit the picture timing SEI message is associated with. The value of num_nalus_in_du_minus1 [i] may be in the range of 0 to PicWidthInCtbs*PicHeightInCtbs−1, inclusive.

The first decoding unit of the access unit consists of the first num_nalus_in_du_minus1[0]+1 consecutive NAL units in decoding order in the access unit. The i-th (with i greater than 0) decoding unit of the access unit consists of the num_nalus_in_du_minus1[i]+1 consecutive NAL units immediately following the last NAL unit in the previous decoding unit of the access unit, in decoding order. There may be at least one VCL NAL unit in each decoding unit. All non-VCL NAL units associated with a VCL NAL unit may be included in the same decoding unit.

du_cpb_removal_delay[i] specifies how many sub-picture clock ticks (see subclause E.2.1 of JCTVC-I1003) to wait after removal from the CPB of the first decoding unit in the access unit associated with the most recent buffering period SEI message in a preceding access unit before removing from the CPB the i-th decoding unit in the access unit associated with the picture timing SEI message. This value is also used to calculate an earliest possible time of arrival of decoding unit data into the CPB for the HSS (e.g., as specified in Annex C of JCTVC-I1003). The syntax element is a fixed length code whose length in bits is given by cpb_removal_delay_length_minus1+1. The du_cpb_removal_delay[i] is the remainder of a modulo $2^{(cpb\_removal\_delay\_length\_minus1+1)}$ counter.

The value of cpb_removal_delay_length_minus1 that determines the length (in bits) of the syntax element du_cpb_removal_delay[i] is the value of cpb_removal_delay_length_minus1 coded in the sequence parameter set that is active for the coded picture associated with the picture timing SEI message, although du_cpb_removal_delay[i] specifies a number of sub-picture clock ticks relative to the removal time of the first decoding unit in the preceding access unit containing a buffering period SEI message, which may be an access unit of a different coded video sequence.

In one configuration, the timing of decoding unit removal and decoding of decoding units may be implemented as follows.

If SubPicCpbFlag is equal to 0, the variable CpbRemovalDelay(m) is set to the value of cpb_removal_delay in the picture timing SEI message associated with the access unit that is decoding unit m, and the variable $T_c$ is set to $t_c$. Otherwise if SubPicCpbFlag is equal to 1 and common_du_cpb_removal_delay_flag is 0 the variable CpbRemovalDelay(m) is set to the value of du_cpb_removal_delay[i] for decoding unit m (with m ranging from 0 to num_decoding_units_minus1) in the picture timing SEI message associated with the access unit that contains decoding unit m, and the variable $T_c$ is set to $t_{c\_sub}$.

In some cases, Otherwise if SubPicCpbFlag is equal to 1 and common_du_cpb_removal_delay_flag is 0, the variable CpbRemovalDelay(m) is set to the value of (m+1)*du_cpb_removal_delay[i] for decoding unit m (with m ranging from 0 to num_decoding_units_minus1) in the picture timing SEI message associated with the access unit that contains decoding unit m, and the variable $T_c$ is set to $t_{c\_sub}$.

Otherwise, if SubPicCpbFlag is equal to 1 and common_du_cpb_removal_delay_flag is 1, the variable CpbRemovalDelay(m) is set to the value of common_du_cpb_removal_delay for decoding unit m in the picture timing SEI message associated with the access unit that contains decoding unit m, and the variable $T_c$ is set to $t_{c\_sub}$.

When a decoding unit m is the decoding unit with n equal to 0 (the first decoding unit of the access unit that initializes the HRD), the nominal removal time of the decoding unit from the CPB is specified by $t_{r,n}(0)$=InitCpbRemovalDelay [SchedSelIdx]/90000.

When a decoding unit m is the first decoding unit of the first access unit of a buffering period that does not initialize the HRD, the nominal removal time of the decoding unit from the CPB is specified by $t_{r,n}(m)=t_{r,n}(m_b)+T_c*CpbRemovalDelay(m)$, where $t_{r,n}(m_b)$ is the nominal removal time of the first decoding unit of the previous buffering period.

When a decoding unit m is the first decoding unit of a buffering period, $m_b$ is set equal to m at the removal time $t_{r,n}(m)$ of the decoding unit m. The nominal removal time $t_{r,n}(m)$ of a decoding unit m that is not the first decoding unit of a buffering period is given by $t_{r,n}(m)=t_{r,n}(m_b)+T_c*CpbRemovalDelay(m)$, where $t_{r,n}(m_b)$ is the nominal removal time of the first decoding unit of the current buffering period.

The removal time of decoding unit m is specified as follows. If low_delay_hrd_flag is equal to 0 or $t_{r,n}(m)>=t_{af}(m)$, the removal time of decoding unit m is specified by $t_r(m)=t_{r,n}(m)$. Otherwise (low_delay_hrd_flag is equal to 1 and $t_{r,n}(m)<t_{af}(m)$), the removal time of decoding unit m is specified by $t_r(m)=t_{r,n}(m)+T_c*Ceil((t_{af}(m)-t_{r,n}(m))/T_c)$. The latter case (low_delay_hrd_flag is equal to 1 and $t_{r,n}(m)<t_{af}(m)$) indicates that the size of decoding unit m, b(m), is so large that it prevents removal at the nominal removal time.

In another case the removal time of decoding unit m is specified as follows. If low_delay_hrd_flag is equal to 0 or $t_{r,n}(m)>=t_{af}(m)$, the removal time of decoding unit m is specified by $t_r(m)=t_{r,n}(m)$. Otherwise (low_delay_hrd_flag is equal to 1 and $t_{r,n}(m)<t_{af}(m)$), the removal time of decoding unit m which is not the last decoding unit in the access unit is specified by $t_r(m)=t_{af}(m)$, and the removal time of decoding unit m which is the last decoding unit in the access unit $t_r(m)=t_{r,n}(m)+T_c*Ceil((t_{af}(m)-t_{r,n}(m))/T_c)$. The latter case (low_delay_hrd_flag is equal to 1 and $t_{r,n}(m)<t_{af}(m)$) indicates that the size of decoding unit m, b(m), is so large that it prevents removal at the nominal removal time.

In another case the removal time of decoding unit m is specified as follows. If low_delay_hrd_flag is equal to 0 or $t_{r,n}(m)>=t_{af}(m)$, the removal time of decoding unit m is specified by $t_r(m)=t_{r,n}(m)$. Otherwise (low_delay_hrd_flag is equal to 1 and $t_{r,n}(m)<t_{af}(m)$), the removal time of decoding unit m which is not the last decoding unit in the access unit is specified by $t_r(m)=t_{af}(m)$, and the removal time of decoding unit m which is the last decoding unit in the access unit $t_r(m)=t_{r,n}(m)+t_c*Ceil((t_{af}(m)-t_{r,n}(m))/t_c)$. The latter case (low_delay_hrd_flag is equal to 1 and $t_{r,n}(m)<t_{af}(m)$) indicates that the size of decoding unit m, b(m), is so large that it prevents removal at the nominal removal time.

In another case the removal time of decoding unit m is specified as follows. If low_delay_hrd_flag is equal to 0 or $t_{r,n}(m)>=t_{af}(m)$, the removal time of decoding unit m is specified by $t_r(m)=t_{r,n}(m)$. Otherwise (low_delay_hrd_flag is equal to 1 and $t_{r,n}(m)<t_{af}(m)$), the removal time of decoding unit m is specified by $t_r(m)=t_{af}(m)$. The latter case (low_delay_hrd_flag is equal to 1 and $t_{r,n}(m)<t_{af}(m)$) indicates that the size of decoding unit m, b(m), is so large that it prevents removal at the nominal removal time.

When SubPicCpbFlag is equal to 1, the nominal CPB removal time of access unit n $t_{r,n}(n)$ is set to the nominal CPB removal time of the last decoding unit in access unit n, the CPB removal time of access unit n $t_r(n)$ is set to the CPB removal time of the last decoding unit in access unit n.

When SubPicCpbFlag is equal to 0, each decoding unit is an access unit, hence the nominal CPB removal time and the CPB removal time of access unit n are the nominal CPB removal time and the CPB removal time of decoding unit n.

At CPB removal time of decoding unit m, the decoding unit is instantaneously decoded.

Another example of modified syntax and semantics for a picture timing SEI message in accordance with the systems and methods disclosed herein is given in Table (2) as follows. Modifications in accordance with the systems and methods disclosed herein are denoted in bold.

TABLE 2

```
pic_timing( payloadSize ) {
    if( CpbDpbDelaysPresentFlag ) {
        cpb_removal_delay
        dpb_output_delay
        if( sub_pic_cpb_params_present_flag ) {
            num_decoding_units_minus1
            common_du_cpb_removal_delay_flag
            if(common_du_cpb_removal_delay_flag) {
                common_num_nalus_in_du_minus1
                common_du_cpb_removal_delay
            }
            for( i = 0; i <= num_decoding_units_minus1 ; i++ ) {
                num_nalus_in_du_minus1 [ i ]
                if(!common_du_cpb_removal_delay_flag)
                    du_cpb_removal_delay[ i ]
            }
        }
    }
}
```

The illustrated example in Table (2) includes a syntax element common_num_nalus_in_du_minus1, which may be used to determine how much data should be removed from the CPB when removing a decoding unit. common_num_nalus_in_du_minus1 plus 1 specifies the number of NAL units in each decoding unit of the access unit the picture timing SEI message is associated with. The value of common_num_nalus_in_du_minus1 may be in the range of 0 to PicWidthInCtbs*PicHeightInCtbs−1, inclusive.

The first decoding unit of the access unit consists of the first common_num_nalus_in_du_minus1+1 consecutive NAL units in decoding order in the access unit. The i-th (with i greater than 0) decoding unit of the access unit consists of the common_num_nalus_in_du_minus1+1 consecutive NAL units immediately following the last NAL unit in the previous decoding unit of the access unit, in decoding order. There may be at least one VCL NAL unit in each decoding unit. All non-VCL NAL units associated with a VCL NAL unit may be included in the same decoding unit.

Another example of modified syntax and semantics for a picture timing SEI message in accordance with the systems and methods disclosed herein is given in Table (3) as follows. Modifications in accordance with the systems and methods disclosed herein are denoted in bold.

TABLE 3

```
pic_timing( payloadSize ) {
    if( CpbDpbDelaysPresentFlag ) {
        cpb_removal_delay
        dpb_output_delay
        if( sub_pic_cpb_params_present_flag ) {
            num_decoding_units_minus1
            common_num_nalus_in_du_flag
            if(common_num_nalus_in_du_flag) {
                common_num_nalus_in_du_minus1
            }
            common_du_cpb_removal_delay_flag
            if(common_du_cpb_removal_delay_flag) {
                common_du_cpb_removal_delay
            }
            for( i = 0; i <= num_decoding_units_minus1 ; i++ ) {
                if(!common_num_nalus_in_du_flag)
```

TABLE 3-continued

```
            num_nalus_in_du_minus1 [ i ]
            if(!common_du_cpb_removal_delay_flag)
              du_cpb_removal_delay[ i ]
          }
        }
      }
    }
```

The illustrated example in Table (3) includes a syntax element common_num_nalus_in_du_flag that, when equal to 1, specifies that the syntax element common_num_nalus_in_du_minus1 is present. common_num_nalus_in_du_flag equal to 0 specifies that the syntax element common_num_nalus_in_du_minus1 is not present.

In yet another embodiment flags common_du_cpb_removal_delay_flag common_num_nalus_in_du_minus1, may not be sent. Instead syntax elements common_num_nalus_in_du_minus1 and common_du_cpb_removal_delay could be sent every time. In this case, a value of 0 (or some other) for these syntax elements could be used to indicate that these elements are not signaled.

In addition to modifications to the syntax elements and semantics of the picture timing SEI message, the present systems and methods may also implement a bitstream constraint so that sub-picture based CPB operation and access unit level CPB operation result in the same timing of decoding unit removal.

When sub_pic_cpb_params_present_flag equals to 1 that sub-picture level CPB removal delay parameters are present, the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value is inferred to be equal to 0.

To support the operation at both access unit level or sub-picture level, the following bitstream constraints may be used: If sub_pic_cpb_params_present_flag is 1, then it is requirement of bitstream conformance that the following constraint is obeyed when signaling the values for cpb_removal_delay and du_cpb_removal_delay[i] for all i:

$$\text{cpb\_removal\_delay} = \frac{\left(\sum_{i=0}^{num\_decoding\_units\_minus1} du\_cpb\_removal\_delay[i]\right) * t_{c,sub}}{t_c}$$

where du_cpb_removal_delay[i] are the decoding unit CPB removal delay parameters, $t_c$ is a clock tick, $t_{c,sub}$ is sub-picture clock tick, num_decoding_units_minus1 is an amount of decoding units in the access unit offset by one, and i is an index. In some embodiments a tolerance parameter could be added to satisfy the above constraint.

To support the operation at both access unit level or sub-picture level, the bitstream constraints as follows may be used: Let the variable $T_{du}(k)$ be defined as:

$$T_{du}(k) = T_{du}(k-1) + t_{c\_sub} * \sum_{i=0}^{num\_decoding\_units\_minus1_k} (du\_cpb\_removal\_delay\_minus1_k[i] + 1)$$

where du_cpb_removal_delay_minus1$_k$[i] and num_decoding_units_minus1$_k$ are parameters for i'th decoding unit of k'th access unit (with k=0 for the access unit that initialized the HRD and $T_{du}(k)=0$ for k<1), and where du_cpb_removal_delay_minus1$_k$[i]+1=du_cpb_removal_delay$_k$[i] is the decoding unit CPB removal delay parameter for the I'th decoding unit of the k'th access unit, and num_decoding_units_minus1$_k$ is the number of decoding units in the k'th access unit, $t_c$ is a clock tick, $t_{c,sub}$ is a sub-picture clock tick, and i and k are an indices. Then when the picture timing flag (e.g., sub_pic_cpb_params_present_flag) is set to 1, the following constraint shall be true: (au_cpb_removal_delay_minus1+1)*$t_c$==$T_{du}$(k), where (au_cpb_removal_delay_minus1+1)=cpb_removal_delay, the CPB removal delay. Thus in this case the CPB removal delay (au_cpb_removal_delay_minus1+1) is set such that the operation of sub-picture based CPB operation and access unit based CPB operation result in the same timing of access unit removal and last decoding unit of the access unit removal.

To support the operation at both access unit level or sub-picture level, the following bitstream constraints may be used: If sub_pic_cpb_params_present_flag is 1, then it is a requirement of bitstream conformance that the following constraint is obeyed when signaling the values for cpb_removal_delay and du_cpb_removal_delay[i] for all i:

$$-1 \le \left[ \text{cpb\_removal\_delay} * t_c - \left(\sum_{i=0}^{num\_decoding\_units\_minus1} du\_cpb\_removal\_delay[i]\right) * t_{c,sub} \right] \le 1$$

where du_cpb_removal_delay[i] are the decoding unit CPB removal delay parameters, $t_c$ is a clock tick, $t_{c,sub}$ is sub-picture clock tick, num_decoding_units_minus1 is an amount of decoding units in the access unit offset by one and i is an index.

To support the operation at both access unit level or sub-picture level, the following bitstream constraints may be used: If sub_pic_cpb_params_present_flag is 1, then it is requirement of bitstream conformance that the following constraint is obeyed when signaling the values for cpb_removal_delay and du_cpb_removal_delay[num_decoding_units_minus1]:
cpb_removal_delay*t=du_cpb_removal_delay[num_decoding_units_minus1]*$t_{c,sub}$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick num_decoding_units_minus1 is an amount of decoding units in the access unit offset by one. In some embodiments a tolerance parameter could be added to satisfy the above constraint.

To support the operation at both access unit level or sub-picture level, the following bitstream constraints may be used: If sub_pic_cpb_params_present_flag is 1, then it is requirement of bitstream conformance that the following constraint is obeyed when signaling the values for cpb_removal_delay and du_cpb_removal_delay[i] for all i: −1<= (cpb_removal_delay*$t_c$−du_cpb_removal_delay[num_decoding_units_minus1]*$t_{c,sub}$)<=1, where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick num_decoding_units_minus1 is an amount of decoding units in the access unit offset by one.

Additionally, the present systems and methods may modify the timing of decoding unit removal. When sub-picture level CPB removal delay parameters are present, the removal time of decoding unit for "big pictures" (when low_delay_hrd_flag is 1 and $t_{r,n}(m)<t_{af}(m)$) may be changed to compensate for difference that can arise due to clock tick counter and sub-picture clock tick counter.

When sub_pic_cpb_params_present_flag equals to 1 then sub-picture level CPB removal delay parameters are present and the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value is inferred to be equal to 0.

Specifically, one example of timing of decoding unit removal and decoding of decoding unit implementation is as follows. The variable SubPicCpbPreferredFlag is either specified by external means, or when not specified by external means, set to 0. The variable SubPicCpbFlag is derived as follows: SubPicCpbFlag=SubPicCpbPreferredFlag & sub_pic_cpb_params_present_flag. If SubPicCpbFlag is equal to 0, the CPB operates at access unit level and each decoding unit is an access unit. Otherwise the CPB operates at sub-picture level and each decoding unit is a subset of an access unit.

If SubPicCpbFlag is equal to 0, the variable CpbRemovalDelay(m) is set to the value of cpb_removal_delay in the picture timing SEI message associated with the access unit that is decoding unit m, and the variable $T_c$ is set to $t_c$. Otherwise the variable CpbRemovalDelay(m) is set to the value of du_cpb_removal_delay[i] for decoding unit m in the picture timing SEI message associated with the access unit that contains decoding unit m, and the variable $T_c$ is set to $t_{c\_sub}$.

When a decoding unit m is the decoding unit with n equal to 0 (the first decoding unit of the access unit that initializes the HRD), the nominal removal time of the decoding unit from the CPB is specified by $t_{r,n}(0)$=InitCpbRemovalDelay[SchedSelIdx]/90000.

When a decoding unit m is the first decoding unit of the first access unit of a buffering period that does not initialize the HRD, the nominal removal time of the decoding unit from the CPB is specified by $t_{r,n}(m)=t_{r,n}(m_b)+T_c$*CpbRemovalDelay(m) where $t_{r,n}(m_b)$ is the nominal removal time of the first decoding unit of the previous buffering period.

When a decoding unit m is the first decoding unit of a buffering period, $m_b$ is set equal to m at the removal time $t_{r,n}(m)$ of the decoding unit m.

The nominal removal time $t_{r,n}(m)$ of a decoding unit m that is not the first decoding unit of a buffering period is given by $t_{r,n}(m)=t_{r,n}(m_b)+T_c$*CpbRemovalDelay(m) where $t_{r,n}(m_b)$ is the nominal removal time of the first decoding unit of the current buffering period.

The removal time of decoding unit m is specified as follows. The variable ClockDiff is defined as ClockDiff= (num_units_in_tick−(num_units_in_sub_tick*(num_decoding_units_minus1+1))/time_scale). In some case it may be requirement of a bitstream conformance that the parameters num_units_in_tick, num_units_in_sub_tick num_decoding_units_minus1 are signaled such that following equation is satisfied.

(num_units_in_tick−(num_units_in_sub_tick*(num_decoding_units_minus1+1)))>=0

In some other case it may be requirement of a bitstream conformance that the parameters num_units_in_tick, num_units_in_sub_tick, num_decoding_units_minus1 may be signaled such that following equation is satisfied.

(num_units_in_tick−(num_units_in_sub_tick*(num_decoding_units_minus1+1)))<=0

If low_delay_hrd_flag is equal to 0 or $t_{r,n}(m)>=t_{af}(m)$, the removal time of decoding unit m is specified by $t_r(m)=t_{r,n}(m)$.

Otherwise, (low_delay_hrd_flag is equal to 1 and $t_{r,n}(m)<t_{af}(m)$), and when sub_pic_cpb_params_present_flag equals to 1 and the CPB is operating at sub-picture level, and if ClockDiff is greater than zero, the removal time of decoding unit m when it is the last decoding unit of the access unit n is specified by $t_r(m)=t_{r,n}(m)+T_c$*Ceil$((t_{af}(m)-t_{r,n}(m))/T_c)$+ClockDiff.

Otherwise (low_delay_hrd_flag is equal to 1 and $t_{r,n}(m)<t_{af}(m)$), and when sub_pic_cpb_params_present_flag equals to 1 and the CPB is operating at access unit level and if ClockDiff is less than zero the removal time of access unit n is specified by $t_r(m)=t_{r,n}(m)+t_c$*Ceil$((t_{af}(m)-t_{r,n}(m))/t_c)$−ClockDiff.

Otherwise (low_delay_hrd_flag is equal to 1 and $t_{r,n}(m)<t_{af}(m)$), the removal time of decoding unit m is specified by $t_r(m)=t_{r,n}(m)+T_c$*Ceil$((t_{af}(m)-t_{r,n}(m))/T_c)$. The latter case (low_delay_hrd_flag is equal to 1 and $t_{r,n}(m)<t_{af}(m)$) indicates that the size of decoding unit m, b(m), is so large that it prevents removal at the nominal removal time.

Otherwise (low_delay_hrd_flag is equal to 1 and $t_{r,n}(m)<t_{af}(m)$) and when a picture timing flag is set to 1 and the CPB is operating at sub-picture level, the removal time for the last decoding unit m of access unit, $t_r(m)$ according to: $t_r(m)=t_{r,n}(m)+$min$((t_{c\_sub}$*Ceil$((t_{af}(m)-t_{r,n}(m))/t_{c\_sub}))$, $(t_c$*Ceil$((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(n)<t_{af}(n)$) and when a picture timing flag is set to 1 and the CPB is operating at access unit level, the removal time for access unit n, $t_r(n)$ according to: $t_r(n)=t_{r,n}(n)+$min $((t_{c\_sub}$*Ceil$((t_{af}(m)-t_{r,n}(m))/t_{c\_sub}))$, $(t_c$*Ceil$((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(m)<t_{af}(m)$) and a picture timing flag is set to 1 and the CPB is operating at sub-picture level, the removal time for the last decoding unit m of access unit, $t_r(m)$ according to: $t_r(m)=t_{r,n}(m)+(t_c$*Ceil$((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(n)<t_{af}(n)$) and a picture timing flag is set to 1 and the CPB is operating at access unit level, the removal time for access unit n, $t_r(n)$ according to: $t_r(n)=t_{r,n}(n)+(t_c$*Ceil$((t_{af}(n)-t_{r,n}$ (n))/$t_c$)) where $t_{r,n}$(m) is the nominal removal time of the last decoding unit n, $t_{c\_sub}$ is sub-picture clock tick, Ceil( ) is a ceiling function, $t_{af}$(m) is a final arrival time of last decoding unit m, $t_{r,n}$(n) is the nominal removal time of the access unit n, $t_c$ is clock tick and $t_{af}$(n) is a final arrival time of access unit n.

Otherwise (low_delay_hrd_flag is equal to 1 and $t_{r,n}$(m) <$t_{af}$(m)) and a picture timing flag is set to 1 and the CPB is operating at sub-picture level, the removal time for the decoding unit which is not the last decoding unit of the access unit is set as $t_r$(m)=$t_{af}$(m), where $t_{af}$(m) is a final arrival time of decoding unit m. And the removal time of the last decoding unit m of access unit, $t_r$(m) is set according to: $t_r$(m)=$t_{r,n}$(m)+($t_{c\_sub}$*Ceil(($t_{af}$(m)−$t_{r,n}$(m))/$t_{c\_sub}$)) where $t_{r,n}$(m) is the nominal removal time of the last decoding unit m, $t_{c\_sub}$ is sub-picture clock tick, Ceil( ) is a ceiling function, $t_{af}$(m) is a final arrival time of last decoding unit m, $t_{r,n}$(n) is the nominal removal time of the access unit n, $t_c$ is clock tick and $t_{af}$(n) is a final arrival time of access unit n and $t_{af}$(m) is a final arrival time of the last decoding unit m in the access unit n.

Otherwise (low_delay_hrd_flag is equal to 1 and $t_{r,n}$(m) <$t_{af}$(m)) and a picture timing flag is set to 1 and the CPB is operating at sub-picture level, the removal time for the decoding unit which is not the last decoding unit of the access unit is set as $t_r$(m)=$t_{af}$(m), where $t_{af}$(m) is a final arrival time of decoding unit m. And the removal time of the last decoding unit m of access unit, $t_r$(m) is set according to: $t_r$(m)=$t_{r,n}$(m)+($t_c$*Ceil(($t_{af}$(m)−$t_{r,n}$(m))/$t_c$)) where $t_{r,n}$(m) is the nominal removal time of the last decoding unit m, $t_{c\_sub}$ is sub-picture clock tick, Ceil( ) is a ceiling function, $t_{af}$(m) is a final arrival time of last decoding unit m, $t_{r,n}$(n) is the nominal removal time of the access unit n, $t_c$ is clock tick and $t_{af}$(n) is a final arrival time of access unit n and $t_{af}$(m) is a final arrival time of the last decoding unit m in the access unit n.

Otherwise (low_delay_hrd_flag is equal to 1 and $t_{r,n}$(m) <$t_{af}$(m)) and a picture timing flag is set to 1 and the CPB is operating at sub-picture level, the removal time for the decoding unit is set as $t_r$(m)=$t_{af}$(m) where $t_{r,n}$(m) is the nominal removal time of the decoding unit m, $t_{c\_sub}$ is sub-picture clock tick, Ceil( ) is a ceiling function, $t_{af}$(m) is a final arrival time of decoding unit m, $t_{r,n}$(n) is the nominal removal time of the access unit n, $t_c$ is clock tick and $t_{af}$(n) is a final arrival time of access unit n and $t_{af}$(m) is a final arrival time of the decoding unit m in the access unit n.

Otherwise (low_delay_hrd_flag is equal to 1 and $t_{r,n}$(n) <$t_{af}$(n)) and a picture timing flag is set to 1 and the CPB is operating at access unit level, the removal time for access unit n, $t_r$(n) according to: $t_r$(n)=$t_{af}$(n) where $t_{r,n}$(m) is the nominal removal time of the last decoding unit n, $t_{c\_sub}$ is sub-picture clock tick, Ceil( ) is a ceiling function, $t_{af}$(m) is a final arrival time of last decoding unit m, $t_{r,n}$(n) is the nominal removal time of the access unit n, $t_c$ is clock tick and $t_{af}$(n) is a final arrival time of access unit n.

When SubPicCpbFlag is equal to 1, the nominal CPB removal time of access unit n $t_{r,n}$(n) is set to the nominal CPB removal time of the last decoding unit in access unit n, the CPB removal time of access unit n $t_r$(n) is set to the CPB removal time of the last decoding unit in access unit n.

When SubPicCpbFlag is equal to 0, each decoding unit is an access unit, hence the nominal CPB removal time and the CPB removal time of access unit n are the nominal CPB removal time and the CPB removal time of decoding unit n. At CPB removal time of decoding unit m, the decoding unit is instantaneously decoded.

As illustrated by the foregoing, the systems and methods disclosed herein provide syntax and semantics that modify a picture timing SEI message bitstreams carrying sub-picture based parameters. In some configurations, the systems and methods disclosed herein may be applied to HEVC specifications.

For convenience, several definitions are given as follows, which may be applied to the systems and methods disclosed herein. A random access point may be any point in a stream of data (e.g., bitstream) where decoding of the bitstream does not require access to any point in a bitstream preceding the random access point to decode a current picture and all pictures subsequent to said current picture in output order.

A buffering period may be specified as a set of access units between two instances of the buffering period SEI message in decoding order. Supplemental Enhancement Information (SEI) may contain information that is not necessary to decode the samples of coded pictures from VCL NAL units. SEI messages may assist in procedures related to decoding, display or other purposes. Conforming decoders may not be required to process this information for output order conformance to HEVC specifications (Annex C of HEVC specifications (JCTVC-I1003) includes specifications for conformance, for example). Some SEI message information may be used to check bitstream conformance and for output timing decoder conformance.

A buffering period SEI message may be an SEI message related to buffering period. A picture timing SEI message may be an SEI message related to CPB removal timing. These messages may define syntax and semantics which define bitstream arrival timing and coded picture removal timing.

A Coded Picture Buffer (CPB) may be a first-in first-out buffer containing access units in decoding order specified in a hypothetical reference decoder (HRD). An access unit may be a set of Network Access Layer (NAL) units that are consecutive in decoding order and contain exactly one coded picture. In addition to the coded slice NAL units of the coded picture, the access unit may also contain other NAL units not containing slices of the coded picture. The decoding of an access unit always results in a decoded picture. A NAL unit may be a syntax structure containing an indication of the type of data to follow and bytes containing that data in the form of a raw byte sequence payload interspersed as necessary with emulation prevention bytes.

As used herein, the term "common" generally refers to a syntax element or a variable that is applicable to more than one thing. For example, in the context of syntax elements in a picture timing SEI message, the term "common" may mean that the syntax element (e.g., common_du_cpb_removal_delay) is applicable to all decoding units in an access unit associated with the picture timing SEI message. Additionally, units of data are described in terms of "n" and "m" generally refer to access units and decoding units, respectively.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 102 in which systems and methods for sending a message and buffering a bitstream may be implemented. In this example, electronic device A 102*a* and electronic device B 102*b* are illustrated. However, it should be noted that one or more of the features and functionality described in relation to electronic device A 102*a* and electronic device B 102*b* may be combined into a single electronic device in some configurations.

Electronic device A 102*a* includes an encoder 104. The encoder 104 includes a message generation module 108. Each of the elements included within electronic device A 102*a* (e.g., the encoder 104 and the message generation module 108) may be implemented in hardware, software or a combination of both.

Electronic device A 102*a* may obtain one or more input pictures 106. In some configurations, the input picture(s) 106 may be captured on electronic device A 102*a* using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be a High Efficiency Video Coding (HEVC) encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. For a CPB that supports operation on a sub-picture level, the electronic device 102 may send sub-picture parameters, (e.g., CPB removal delay parameter). Specifically, the electronic device 102 (e.g., the encoder 104) may determine whether to include a common decoding unit CPB removal delay parameter in a picture timing SEI message. For example, the electronic device may set a flag (e.g., common_du_cpb_removal_delay_flag) to one when the encoder 104 is including a common decoding unit CPB removal delay parameter (e.g., common_du_cpb_removal_delay) in the picture timing SEI message. When the common decoding unit CPB removal delay parameter is included, the electronic device may generate the common decoding unit CPB removal delay parameter that is applicable to all decoding units in an access unit. In other words, rather than including a decoding unit CPB removal delay parameter for each decoding unit in an access unit, a common parameter may apply to all decoding units in the access unit with which the picture timing SEI message is associated.

In contrast, when the common decoding unit CPB removal delay parameter is not to be included in the picture timing SEI message, the electronic device 102 may generate a separate decoding unit CPB removal delay for each decoding unit in the access unit with which the picture timing SEI message is associated. A message generation module 108 may perform one or more of the procedures described in connection with FIG. 2 and FIG. 3 below.

In some configurations, electronic device A 102*a* may send the message to electronic device B 102*b* as part of the bitstream 114. In some configurations electronic device A 102*a* may send the message to electronic device B 102*b* by a separate transmission 110. For example, the separate transmission may not be part of the bitstream 114. For instance, a picture timing SEI message or other message may be sent using some out-of-band mechanism. It should be noted that, in some configurations, the other message may include one or more of the features of a picture timing SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a picture timing SEI message or other message, slice header(s), Picture Parameter Set(s) (PPS(s)), etc. As additional input pictures 106 are encoded, the bitstream 114 may include one or more encoded pictures. For instance, the bitstream 114 may include one or more encoded pictures with corresponding overhead data (e.g., a picture timing SEI message or other message).

The bitstream 114 may be provided to a decoder 112. In one example, the bitstream 114 may be transmitted to electronic device B 102*b* using a wired or wireless link. In some cases, this may be done over a network, such as the Internet or a Local Area Network (LAN). As illustrated in FIG. 1, the decoder 112 may be implemented on electronic device B 102*b* separately from the encoder 104 on electronic device A 102*a*. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. The CPB 120 may use parameters found in a picture timing SEI message to determine when to remove data. When the CPB 120 supports operation on a sub-picture level, individual decoding units may be removed rather than entire access units at one time.

The decoder 112 may receive a message (e.g., picture timing SEI message or other message). The decoder 112 may also determine whether the received message includes a common decoding unit CPB removal delay parameter (e.g., common_du_cpb_removal_delay). This may include identifying a flag (e.g., common_du_cpb_removal_delay_flag) that is set when the common parameter is present in the picture timing SEI message. If the common parameter is present, the decoder 112 may determine the common decoding unit CPB removal delay parameter applicable to all decoding units in the access unit. If the common parameter is not present, the decoder 112 may determine a separate decoding unit CPB removal delay parameter for each decoding unit in the access unit. The decoder 112 may also remove decoding units from the CPB 120 using either the common decoding unit CPB removal delay parameter or the separate decoding unit CPB removal delay parameters. The CPB 120 may perform one or more of the procedures described in connection with FIG. 4 and FIG. 5 below.

The HRD described above may be one example of the decoder 112 illustrated in FIG. 1. Thus, an electronic device 102 may operate in accordance with the HRD and CPB 120 described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 2:
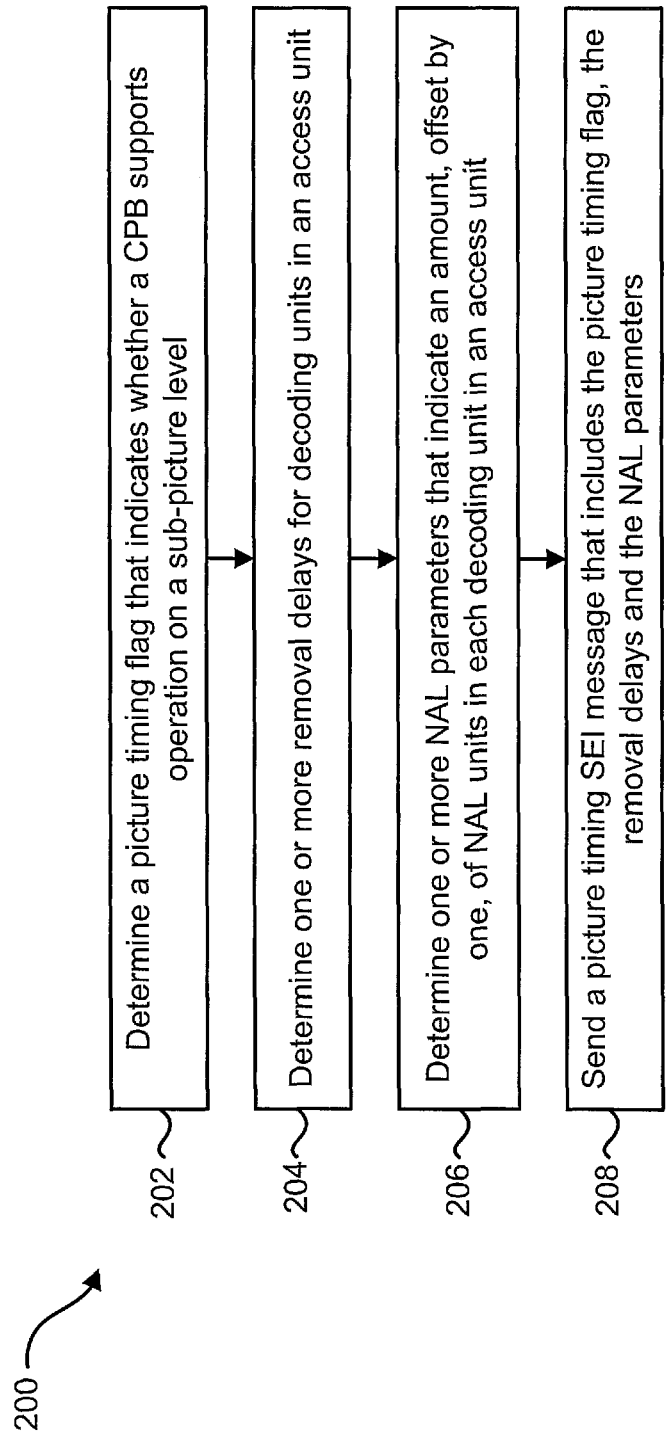
FIG. 2 is a flow diagram illustrating one configuration of a method for sending a message.

FIG. 2 is a flow diagram illustrating one configuration of a method 200 for sending a message. The method 200 may be performed by an encoder 104 or one of its sub-parts (e.g., a message generation module 108). The encoder 104 may determine 202 a picture timing flag (e.g., sub_pic_cpb_params_present_flag) that indicates whether a CPB 120 supports operation on a sub-picture level. For example, when the picture timing flag is set to 1, the CPB 120 may operate on an access unit level or a sub-picture level. It should be noted that even when the picture timing flag is set to 1, the decision about whether to actually operate at the sub-picture level is left to the decoder 112 itself.

The encoder 104 may also determine 204 one or more removal delays for decoding units in an access unit. For example, the encoder 104 may determine a single common decoding unit CPB removal delay parameter (e.g., common_du_cpb_removal_delay) that is applicable to all decoding units in the access unit from the CPB 120. Alternatively, the encoder 104 may determine a separate decoding unit CPB removal delay (e.g., du_cpb_removal_delay[i]) for each decoding unit in the access unit.

The encoder 104 may also determine 206 one or more NAL parameters that indicate an amount, offset by one, of NAL units in each decoding unit in the access point. For example, the encoder 104 may determine a single common NAL parameter (e.g., common_num_nalus_in_du_minus1) that is applicable to all decoding units in the access unit from the CPB 120. Alternatively, the encoder 104 may determine a separate decoding unit CPB removal delay (e.g., num_nalus_in_du_minus1[i]) for each decoding unit in the access unit.

The encoder 104 may also send 208 a picture timing SEI message that includes the picture timing flag, the removal delays and the NAL parameters. The picture timing SEI message may also include other parameters (e.g., cpb_removal_delay, dpb_output_delay, etc). For example, the electronic device 102 may transmit the message via one or more of wireless transmission, wired transmission, device bus, network, etc. For instance, electronic device A 102a may transmit the message to electronic device B 102b. The message may be part of the bitstream 114, for example. In some configurations, electronic device A 102a may send 208 the message to electronic device B 102b in a separate transmission 110 (that is not part of the bitstream 114). For instance, the message may be sent using some out-of-band mechanism. In some case, the information indicated in 204, 206 may be sent in a SEI message different than picture timing SEI message. In yet another case the information indicated in 204, 206 may be sent in a parameter set e.g. video parameter set and/or sequence parameter set and/or picture parameter set and/or adaptation parameter set and/or slice header.

Figure 3:
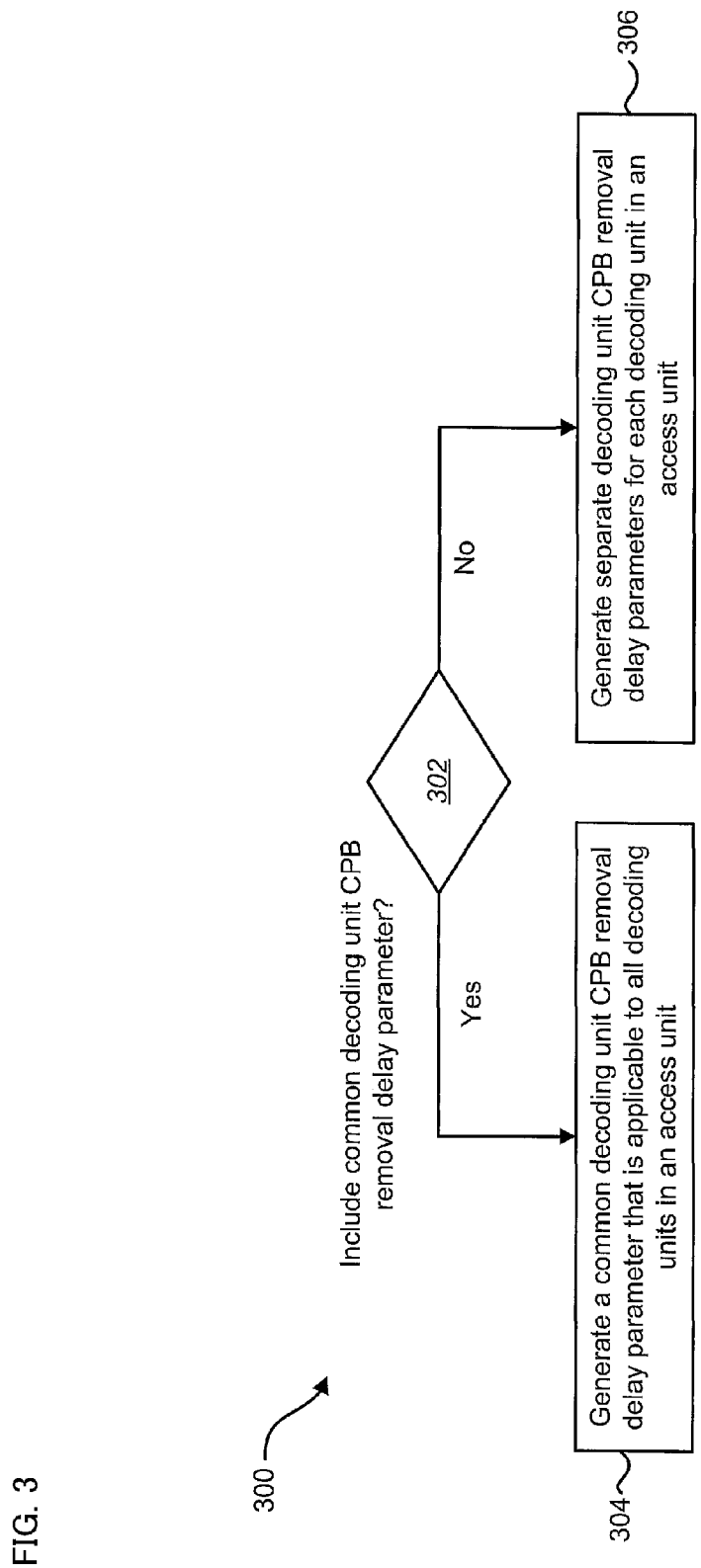
FIG. 3 is a flow diagram illustrating one configuration of a method for determining one or more removal delays for decoding units in an access unit.

FIG. 3 is a flow diagram illustrating one configuration of a method 300 for determining one or more removal delays for decoding units in an access unit. In other words, the method 300 illustrated in FIG. 3 may further illustrate step 204 in the method 200 illustrated in FIG. 2. The method 300 may be performed by an encoder 104. The encoder 104 may determine 302 whether to include a common decoding unit CPB removal delay parameter (e.g., common_du_cpb_removal_delay). This may include determining whether a common decoding unit CPB removal delay flag (e.g., common_du_cpb_removal_delay_flag) is set. An encoder 104 may send this common parameter in case the decoding units are removed from the CPB at regular interval. This may be the case, for example, when each decoding unit corresponds to certain number of rows of the picture or has some other regular structure.

For example, the common decoding unit CPB removal delay flag may be set to 1 when the common decoding unit CPB removal delay parameter is to be included in the picture timing SEI message and 0 when it is not to be included. If yes (e.g., flag is set to 1), the encoder 104 may determine 304 a common decoding unit CPB removal delay parameter (e.g., common_du_cpb_removal_delay) that is applicable to all decoding units in an access unit. If no (e.g., flag is set to 0), the encoder 104 may determine 306 separate decoding unit CPB removal delay parameters (e.g., du_cpb_removal_delay[i]) for each decoding unit in an access unit.

If a common decoding unit CPB removal delay parameter is present in a picture timing SEI message, it may specify an amount of sub-picture clock ticks to wait after removal from the CPB 120 of an immediately preceding decoding unit before removing from the CPB 120 a current decoding unit in the access unit associated with the picture timing SEI message.

For example, when a decoding unit is a first decoding unit in an access unit, the common decoding unit CPB 120 removal delay parameter may specify an amount of sub-picture clock ticks to wait after removal from the CPB 120 of a last decoding unit in an access unit associated with a most recent buffering period SEI message in a preceding access unit before removing from the CPB 120 the first decoding unit in the access unit associated with the picture timing SEI message.

When the decoding unit is a non-first decoding unit in an access unit, the common decoding unit CPB removal delay parameter may specify an amount of sub-picture clock ticks to wait after removal from the CPB 120 of a preceding decoding unit in the access unit associated with the picture timing SEI message before removing from the CPB a current decoding unit in the access unit associated with the picture timing SEI message.

In contrast, when a common decoding unit CPB removal delay parameter (e.g., common_du_cpb_removal_delay) is not sent in a picture timing SEI message, separate decoding unit CPB removal delay parameters (e.g., du_cpb_removal_delay[i]) may be included in the picture timing SEI message for each decoding unit in an access unit. The decoding unit CPB removal delay parameters (e.g., du_cpb_removal_delay[i]) may specify an amount of sub-picture clock ticks to wait after removal from the CPB 120 of the last decoding unit before removing from the CPB 120 an i-th decoding unit in the access unit associated with the picture timing SEI message. The decoding unit CPB removal delay parameters may be calculated according to a remainder of a modulo $2^{(cpb\_removal\_delay\_length\_minus1+1)}$ counter where cpb_removal_delay_length_minus1+1 is a length of a common decoding unit CPB removal delay parameter.

Figure 4:
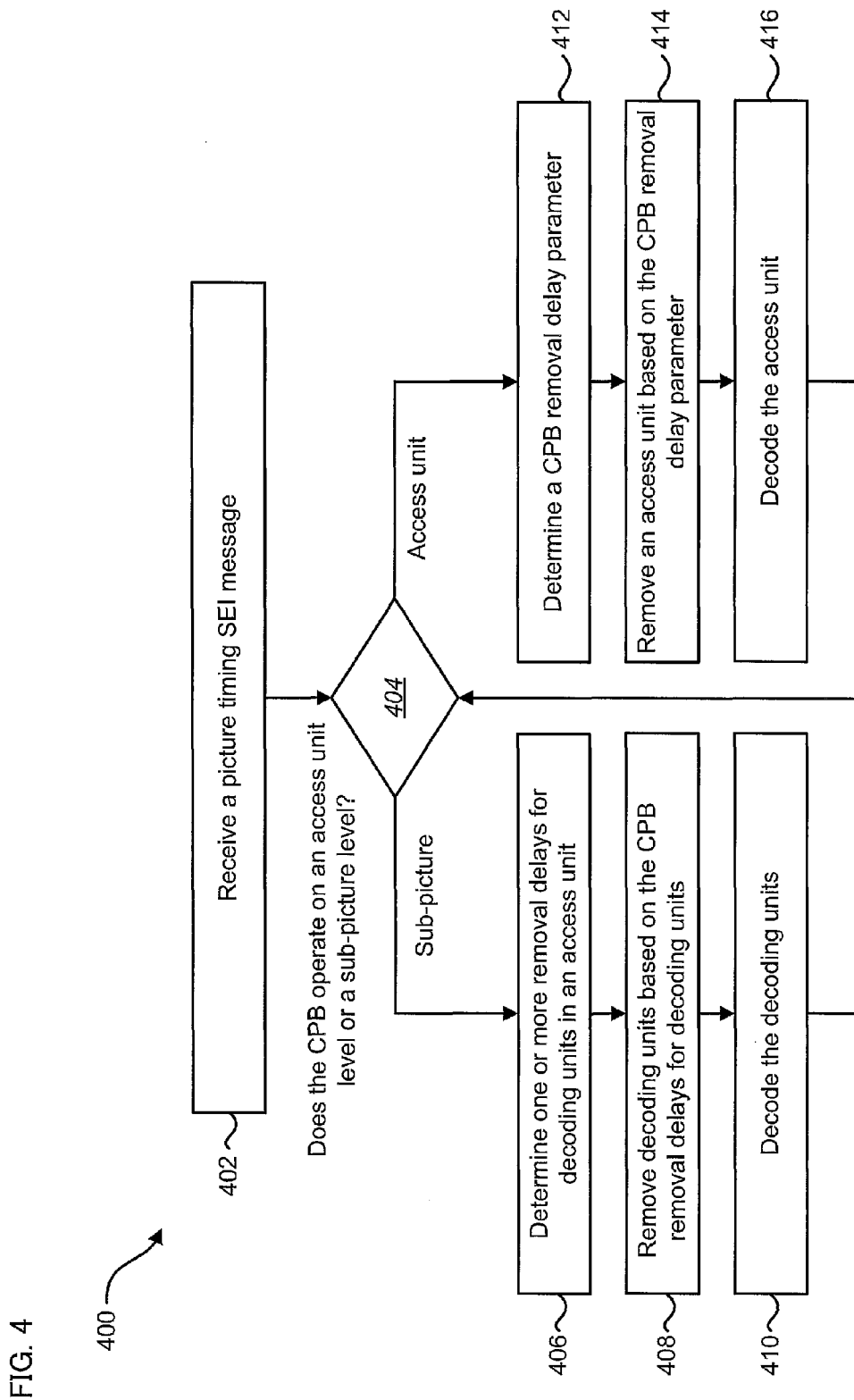
FIG. 4 is a flow diagram illustrating one configuration of a method for buffering a bitstream.

FIG. 4 is a flow diagram illustrating one configuration of a method 400 for buffering a bitstream. The method 400 may be performed by a decoder 112 in an electronic device 102

(e.g., electronic device B 102b), which may receive 402 a message (e.g., a picture timing SEI message or other message). For example, the electronic device 102 may receive 402 the message via one or more of wireless transmission, wired transmission, device bus, network, etc. For instance, electronic device B 102b may receive 402 the message from electronic device A 102a. The message may be part of the bitstream 114, for example. In another example, electronic device B 102b may receive the message from electronic device A 102a in a separate transmission 110 (that is not part of the bitstream 114, for example). For instance, the picture timing SEI message may be received using some out-of-band mechanism. In some configurations, the message may include one or more of a picture timing flag, one or more removal delays for decoding units in an access unit and one or more NAL parameters. Thus, receiving 402 the message may include receiving one or more of a picture timing flag, one or more removal delays for decoding units in an access unit and one or more NAL parameters.

The decoder 112 may determine 404 whether a CPB 120 operates on an access unit level or a sub-picture level. For example, a decoder 112 may decide to operate on sub-picture basis if it wants to achieve low latency. Alternatively, the decision may be based on whether the decoder 112 has enough resources to support sub-picture based operation. If the CPB 120 operates on a sub-picture level, the decoder may determine 406 one or more removal delays for decoding units in an access unit. For example, the decoder 112 may determine a single common decoding unit CPB removal delay parameter (e.g., common_du_cpb_removal_delay) that is applicable to all decoding units in the access unit. Alternatively, the decoder 112 may determine a separate decoding unit CPB removal delay (e.g., du_cpb_removal_delay[i]) for each decoding unit in the access unit. In other words, the picture timing SEI message may include a common parameter applicable to all decoding units in an access unit or separate parameters for every decoding unit.

The decoder 112 may also remove 408 decoding units based on the CPB removal delays for the decoding units, i.e., using either a common parameter applicable to all decoding units in an access unit or separate parameters for every decoding unit. The decoder 112 may also decode 410 the decoding units.

The decoder 112 may use a variable ClockDiff when determining a removal time for determined from various signaled parameters. Specifically, ClockDiff may be determined according to ClockDiff=(num_units_in_tick−(num_units_in_sub_tick*(num_decoding_units_minus1+1))/time_scale), where num_units_in_tick is number of time units of a clock operating at the frequency time_scale Hz that corresponds to one increment of a clock tick counter, num_units_in_sub_tick is number of time units of a clock operating at the frequency time_scale Hz that corresponds to one increment of a sub-picture clock tick counter, num_decoding_units_minus1+1 is an amount of decoding units in the access unit, and time_scale is the number of time units that pass in one second.

When a low delay hypothetical reference decoder (HRD) flag (e.g., low_delay_hrd_flag) is set to 1, $t_{r,n}(m)<t_{af}(m)$, a picture timing flag is set to 1, the CPB is operating at sub-picture level and ClockDiff is greater than zero, the removal time for decoding unit m, $t_r(m)$ is determined according to: $t_r(m)=t_{r,n}(m)+t_{c\_sub}*\text{Ceil}((t_{af}(m)-t_{r,n}(m))/t_{c\_sub})+\text{ClockDiff}$ where $t_{r,n}(m)$ is the nominal removal time of the decoding unit m, $t_{c\_sub}$ is a sub-picture clock tick, Ceil( ) is a ceiling function and $t_{af}(m)$ is final arrival time of decoding unit m.

When a low delay hypothetical reference decoder (HRD) flag (e.g., low_delay_hrd_flag) is set to 1, $t_{r,n}(n)<t_{af}(n)$, a picture timing flag is set to 1, the CPB is operating at an access unit level and ClockDiff is greater than zero, the removal time for access unit n, $t_r(n)$ is determined according to: $t_r(n)=t_{r,n}(n)+t_c*\text{Ceil}((t_{af}(n)-t_{r,n}(n))/t_c)-\text{ClockDiff}$, where $t_{r,n}(n)$ is the nominal removal time of the access unit n, $t_c$ is a clock tick, Ceil( ) is a ceiling function and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$, according to: $t_r(m)=t_{r,n}(m)+\max((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\max((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\min((t_{c\_sub}*\text{Ceil}((t_{af}(m)-t_{r,n}(m))/t_{c\_sub})), (t_e*\text{Ceil}((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\min((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+(t_c*\text{Ceil}((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+(t_c*\text{Ceil}((t_{af}(n)-t_{r,n}(n))/t_c))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time for the last decoding unit m of access unit, $t_r(m)$ according to: $t_r(m)=t_{r,n}(m)+(t_{c\_sub}*\text{Ceil}((t_{af}(m)-t_{r,n}(m))/t_{c\_sub}))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, tc is clock tick, $t_{af}(n)$ is a final arrival time of access unit n and $t_{af}(m)$ is a final arrival time of the last decoding unit in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time for the last decoding unit m of access unit, $t_r(m)$ according to: $t_r(m)=t_{r,n}(m)+(t_c*\text{Ceil}((t_{af}(m)-t_{r,n}(m))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick, $t_{af}(n)$ is a final arrival time of access unit n and $t_{af}(m)$ is a final arrival time of the last decoding unit in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit is set as $t_r(m)=t_{af}(m)$ where $t_{r,n}(m)$ is the nominal removal time of the decoding unit m, $t_{c\_sub}$ is sub-picture clock tick, Ceil( ) is a ceiling function, $t_{af}(m)$ is a final arrival time of decoding unit m, $t_{r,n}(n)$ is the nominal removal time of the access unit n, $t_c$ is clock tick, $t_{af}(n)$ is a final arrival time of access unit n and $t_{af}(m)$ is a final arrival time of the decoding unit in the access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{af}(n)$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

If the CPB operates on an access unit level, the decoder 112 may determine 412 a CPB removal delay parameter. This may be included in the received picture timing SEI message (e.g., cpb_removal_delay). The decoder 112 may also remove 414 an access unit based on the CPB removal delay parameter and decode 416 the access unit. In other words, the decoder 112 may decode whole access units at a time, rather than decoding units within the access unit.

Figure 5:
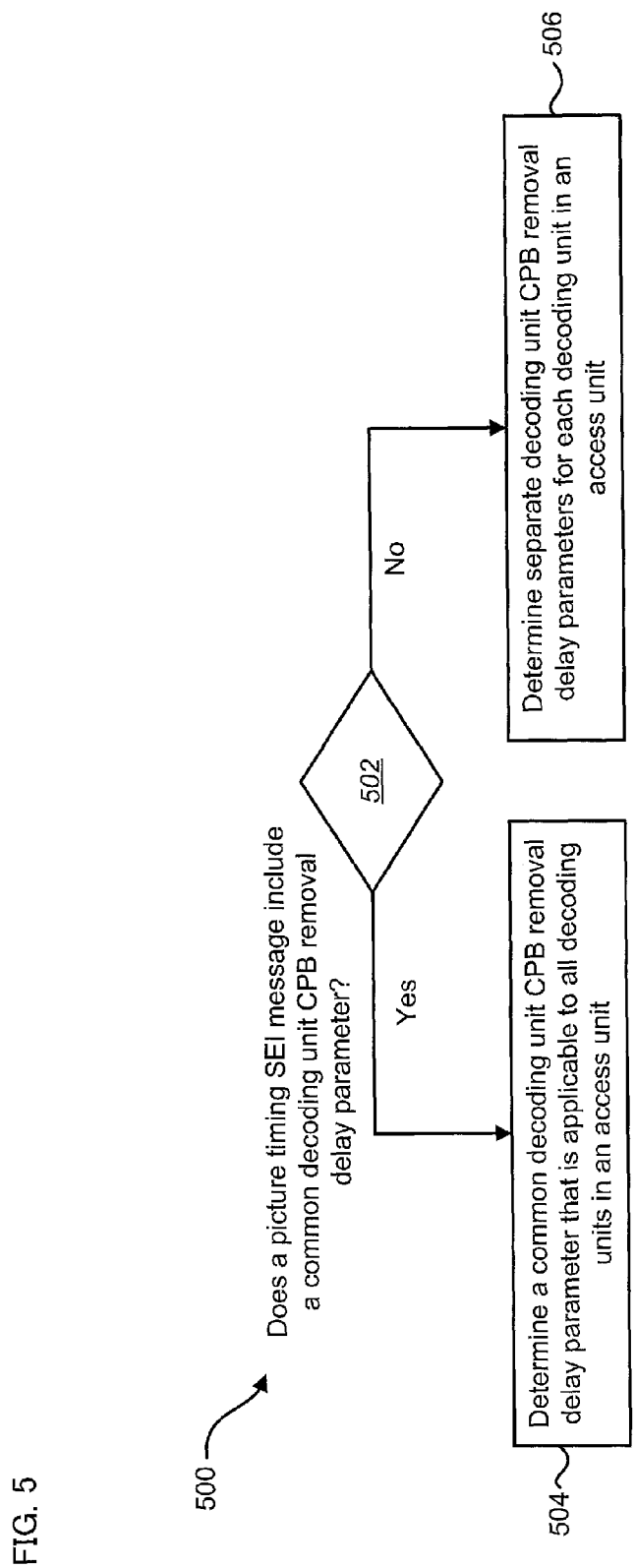
FIG. 5 is a flow diagram illustrating one configuration of a method for determining one or more removal delays for decoding units in an access unit.

FIG. 5 is a flow diagram illustrating one configuration of a method 500 for determining one or more removal delays for decoding units in an access unit. In other words, the method 500 illustrated in FIG. 5 may further illustrate step 406 in the method 400 illustrated in FIG. 4. The method 500 may be performed by a decoder 112. The decoder 112 may determine 502 whether a received picture timing SEI message includes a common decoding unit CPB removal delay parameter. This may include determining whether a common decoding unit CPB removal delay flag (e.g., common_du_cpb_removal_delay_flag) is set. If yes, the decoder 112 may determine 504 a common decoding unit CPB removal delay parameter (e.g., common_du_cpb_removal_delay) that is applicable to all decoding units in an access unit. If no, the decoder 112 may determine 506 separate decoding unit CPB removal delay parameters (e.g., du_cpb_removal_delay[i]) for each decoding unit in an access unit.

In addition to modifying the picture timing SEI message semantics, the present systems and methods may also impose a bitstream constraint so that the operation of sub-picture based CPB operation and access unit based CPB operation result in the same timing of decoding unit removal. Specifically, when the picture timing flag (e.g., sub_pic_cpb_params_present_flag) is set to 1, the CPB removal delay may be set according to $$\text{cpb\_removal\_delay} = \frac{\left(\sum_{i=0}^{num\_decoding\_units\_minus1} \text{du\_cpb\_removal\_delay}[i]\right) * t_{c,sub}}{t_c}$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, the CPB removal delay may be set as described next: Let the variable Tdu(k) be defined as:

$$T_{du}(k) = T_{du}(k-1) + t_{c\_sub} * \sum_{i=0}^{num\_decoding\_units\_minus1_k} (\text{du\_cpb\_removal\_delay\_minus1}_k[i]+1)$$

where du_cpb_removal_delay_minus1$_k$[i] and num_decoding_units_minus1$_k$ are parameters for i'th decoding unit of k'th access unit (with k=0 for the access unit that initialized the HRD and $T_{du}(k)=0$ for k<1), and where du_cpb_removal_delay_minus1$_k$[i]+1=du_cpb_removal_delay$_k$[i] is the decoding unit CPB removal delay parameter for the I'th decoding unit of the k'th access unit, and num_decoding_units_minus1$_k$ is the number of decoding units in the k'th access unit, $t_c$ is a clock tick, $t_{c,sub}$ is a sub-picture clock tick, and i and k are an indices. Then when the picture timing flag (e.g., sub_pic_cpb_params_present_flag) is set to 1, the following condition shall be true:

(au_cpb_removal_delay_minus1+1)*$t_c$==$T_{du}(k)$,
    where (au_cpb_removal_delay_minus1+1)=cpb_removal_delay, the CPB removal delay. Thus in this case the CPB removal delay (au_cpb_removal_delay_minus1+1) is set such that the operation of sub-picture based CPB operation and access unit based CPB operation result in the same timing of access unit removal and last decoding unit of the access unit removal.

Alternatively, the CPB removal delay may be set according to $$-1 \leq \left[ \text{cpb\_removal\_delay} * t_c - \left( \sum_{i=0}^{num\_decoding\_units\_minus1} \text{du\_cpb\_removal\_delay}[i] \right) * t_{c,sub} \right] \leq 1$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one and i is an index.

Alternatively, cpb_removal_delay and du_cpb_removal_delay[num_decoding_units_minus1] may be set according to: cpb_removal_delay*$t_c$=du_cpb_removal_delay [num_decoding_units_minus1]*$t_{c,sub}$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one.

In addition to modifying the picture timing SEI message semantics, the present systems and methods may also impose a bitstream constraint so that the operation of sub-picture based CPB operation and access unit based CPB operation result in the same timing of decoding unit removal. Specifically, when the picture timing flag (e.g., sub_pic_cpb_params_present_flag) is set to 1, the values for cpb_removal_delay and du_cpb_removal_delay[num_decoding_units_minus1] may be set so as to satisfy: −1<= (cpb_removal_delay*$t_c$−du_cpb_removal_delay[num_decoding_units_minus1]*$t_{c,sub}$)<=1 where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick num_decoding_units_minus1 is an amount of decoding units in the access unit offset by one.

Figure 6:
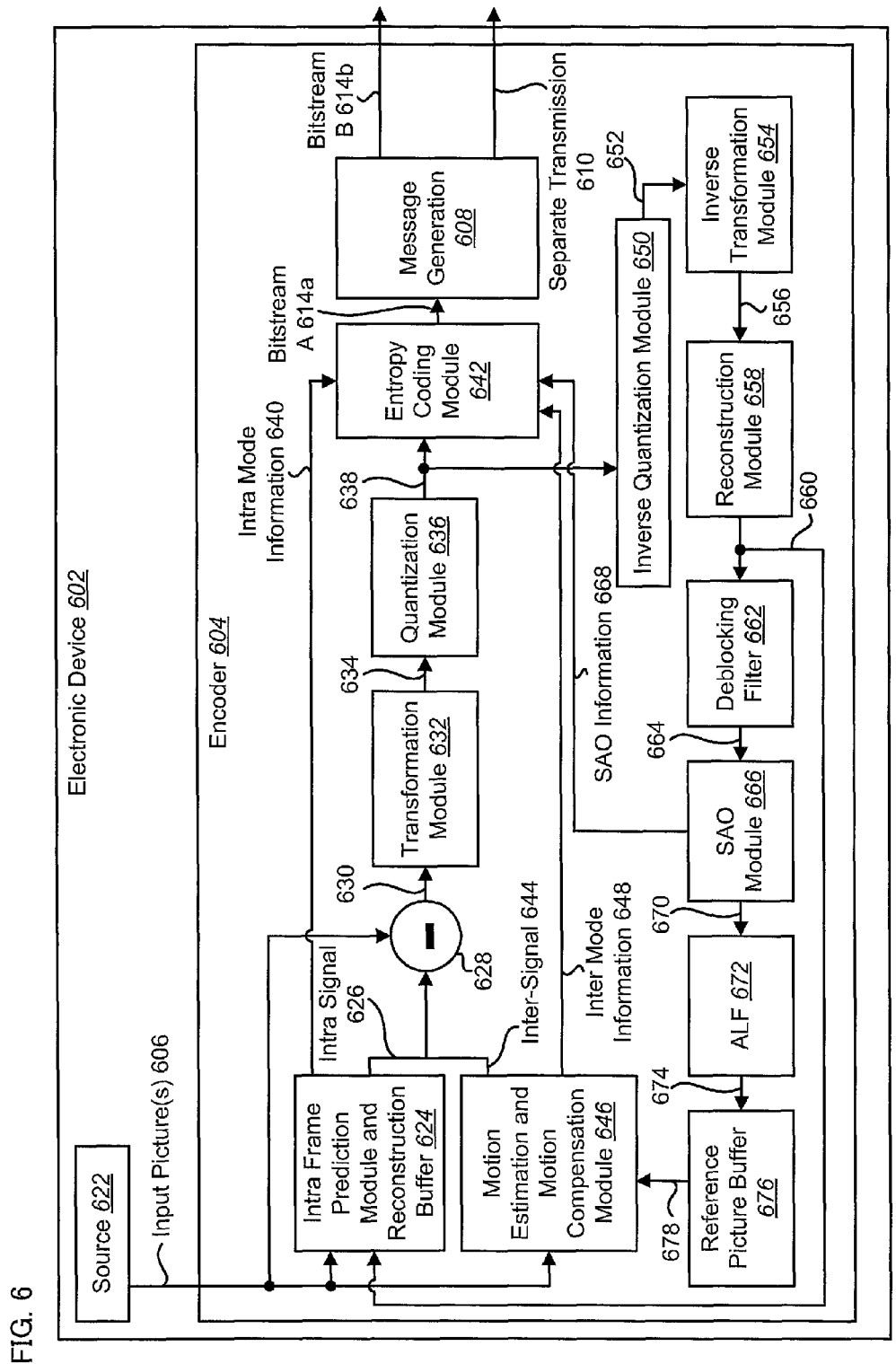
FIG. 6 is a block diagram illustrating one configuration of an encoder 604 on an electronic device.

FIG. 6 is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 622. The source 622 may provide picture or image data (e.g., video) as one or more input pictures 606 to the encoder 604.

Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra-signal 626 based on one or more input pictures 606 and reconstructed data 660. The motion estimation and motion compensation module 646 may generate inter mode information 648 and an inter signal 644 based on one or more input pictures 606 and a reference picture buffer 676 signal 678. In some configurations, the reference picture buffer 676 may include data from one or more reference pictures in the reference picture buffer 676.

The encoder 604 may select between the intra signal 626 and the inter signal 644 in accordance with a mode. The intra signal 626 may be used in order to exploit spatial characteristics within a picture in an intra-coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the reference picture buffer 676. The ALF signal 674 may include data from one or more pictures that may be used as reference pictures.

The entropy coding module 642 may code the TQCs 638 to produce bitstream A 614*a* (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614*a* (e.g., encoded picture data) may be provided to a message generation module 608. The message generation module 608 may be configured similarly to the message generation module 108 described in connection with FIG. 1. Additionally or alternatively, the message generation module 608 may perform one or more of the procedures described in connection with FIG. 2 and FIG. 3.

For example, the message generation module 608 may generate a message (e.g., picture timing SEI message or other message) including sub-picture parameters. The sub-picture parameters may include one or more removal delays for decoding units (e.g., common_du_cpb_removal_delay or du_cpb_removal_delay[i]) and one or more NAL parameters (e.g., common_num_nalus_in_du_minus1 or num_nalus_in_du_minus1[i]). In some configurations, the message may be inserted into bitstream A 614*a* to produce bitstream B 614*b*. Thus, the message may be generated after the entire bitstream A 614*a* is generated (e.g., after most of bitstream B 614*b* is generated), for example. In other configurations, the message may not be inserted into bitstream A 614*a* (in which case bitstream B 614*b* may be the same as bitstream A 614*a*), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 7:
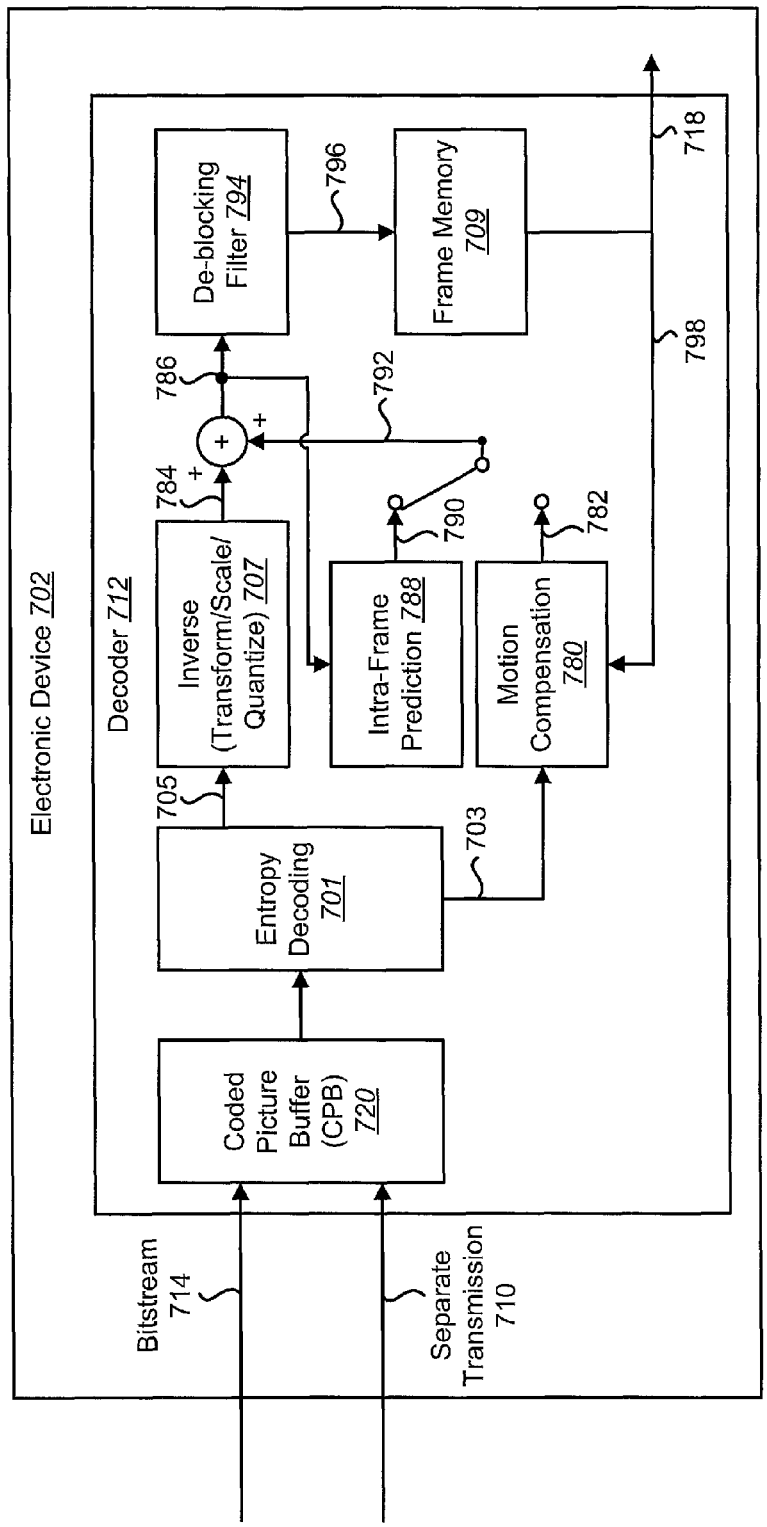
FIG. 7 is a block diagram illustrating one configuration of a decoder on an electronic device.

FIG. 7 is a block diagram illustrating one configuration of a decoder 712 on an electronic device 702. The decoder 712 may be included in an electronic device 702. For example, the decoder 712 may be a HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., picture timing SEI message or other message), slice header, PPS, etc. In some configurations, the decoder 712 may additionally receive a separate transmission 710. The separate transmission 710 may include a message (e.g., a picture timing SEI message or other message). For example, a picture timing SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. Additionally or alternatively, the decoder 712 may perform one or more of the procedures described in connection with FIG. 4 and FIG. 5. For example, the decoder 712 may receive a message (e.g., picture timing SEI message or other message) with sub-picture parameters and remove and decode decoding units in an access unit based on the sub-picture parameters. It should be noted that one or more access units may be included in the bitstream and may include one or more of encoded picture data and overhead data.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a frame memory 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to frame memory 709. The resulting filtered signal 796 may include a decoded picture. The frame memory 709 may provide a decoded picture 718. In some cases 709 may be a decoded picture buffer.

Figure 8:
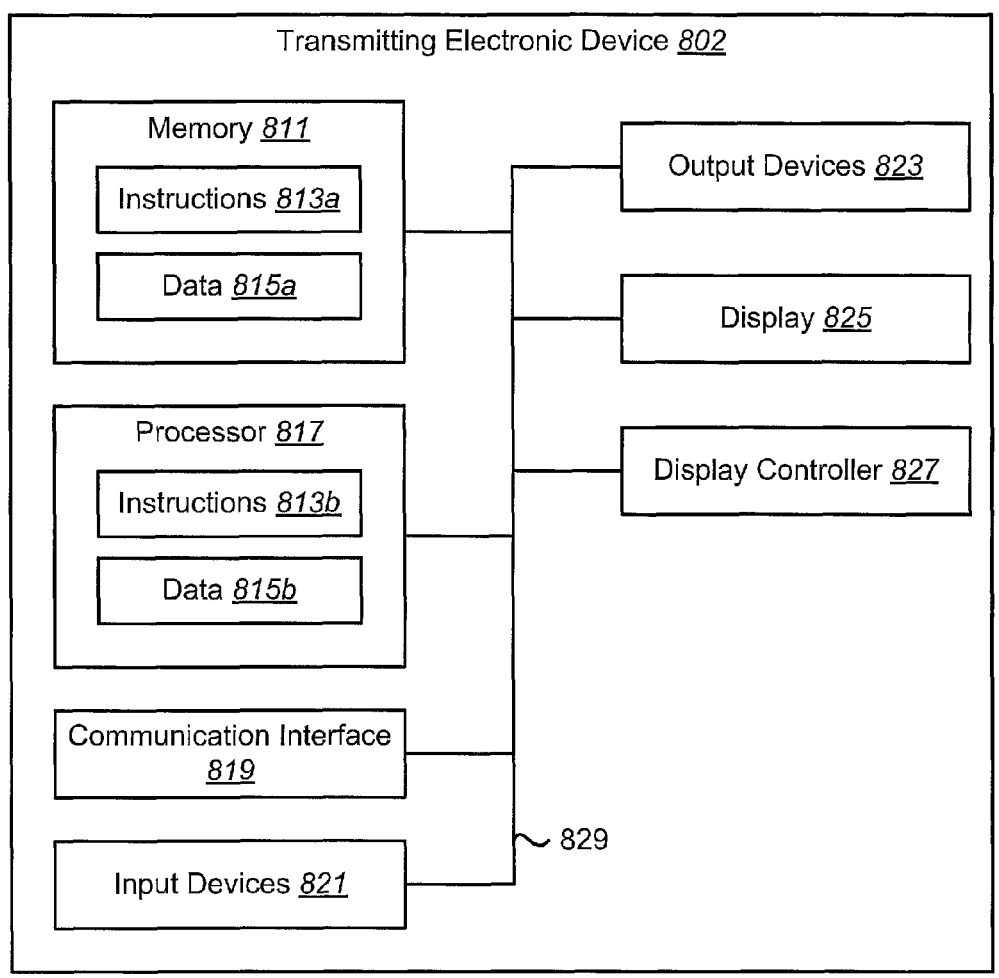
FIG. 8 illustrates various components that may be utilized in a transmitting electronic device.

FIG. 8 illustrates various components that may be utilized in a transmitting electronic device 802. One or more of the electronic devices 102, 602, 702 described herein may be implemented in accordance with the transmitting electronic device 802 illustrated in FIG. 8.

The transmitting electronic device 802 includes a processor 817 that controls operation of the electronic device 802. The processor 817 may also be referred to as a CPU. Memory 811, which may include both read-only memory (ROM), random access memory (RAM) or any type of device that may store information, provides instructions 813*a* (e.g., executable instructions) and data 815*a* to the processor 817. A portion of the memory 811 may also include non-volatile random access memory (NVRAM). The memory 811 may be in electronic communication with the processor 817.

Instructions 813*b* and data 815*b* may also reside in the processor 817. Instructions 813*b* and/or data 815*b* loaded into the processor 817 may also include instructions 813*a* and/or data 815*a* from memory 811 that were loaded for execution or processing by the processor 817. The instructions 813*b* may be executed by the processor 817 to implement the systems and methods disclosed herein. For example, the instructions 813*b* may be executable to perform one or more of the methods 200, 300, 400, 500 described above.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The transmitting electronic device 802 may include one or more output devices 823 and one or more input devices 821. Examples of output devices 823 include a speaker, printer, etc. One type of output device that may be included in an electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 8 as the bus system 829. The transmitting electronic device 802 illustrated in FIG. 8 is a functional block diagram rather than a listing of specific components.

Figure 9:
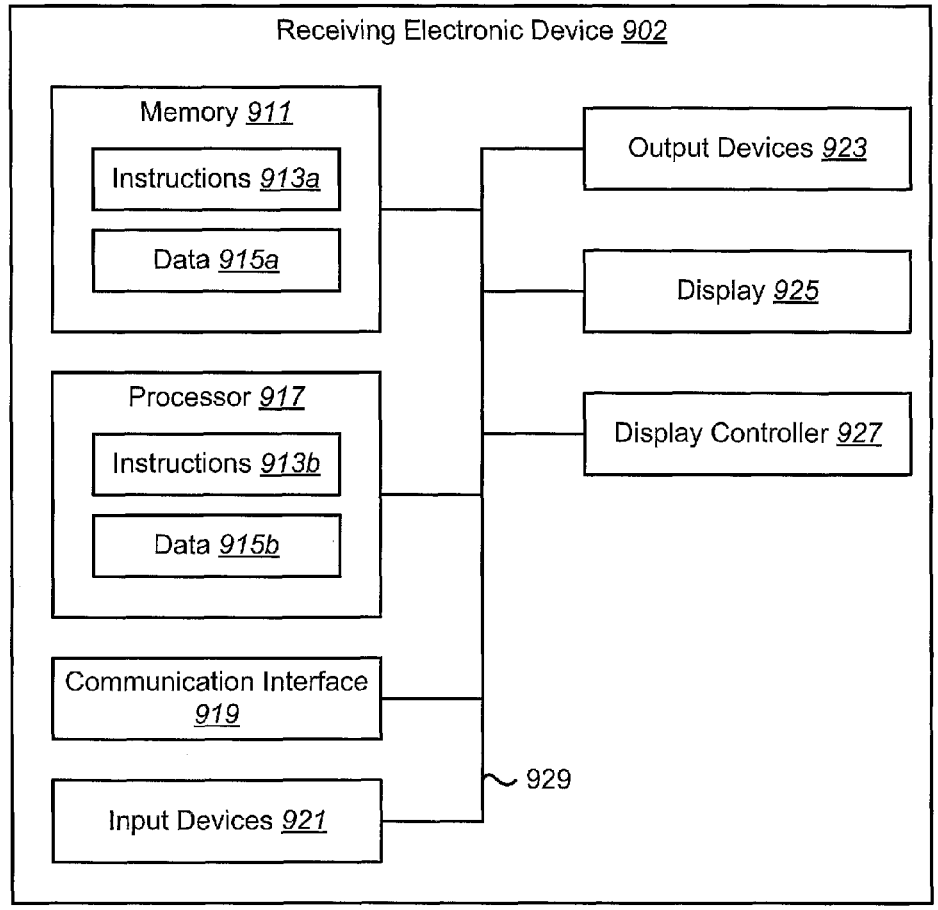
FIG. 9 is a block diagram illustrating various components that may be utilized in a receiving electronic device.

FIG. 9 is a block diagram illustrating various components that may be utilized in a receiving electronic device 902. One or more of the electronic devices 102, 602, 702 described herein may be implemented in accordance with the receiving electronic device 902 illustrated in FIG. 9.

The receiving electronic device 902 includes a processor 917 that controls operation of the electronic device 902. The processor 917 may also be referred to as a CPU. Memory 911, which may include both read-only memory (ROM), random access memory (RAM) or any type of device that may store information, provides instructions 913a (e.g., executable instructions) and data 915a to the processor 917. A portion of the memory 911 may also include non-volatile random access memory (NVRAM). The memory 911 may be in electronic communication with the processor 917.

Instructions 913b and data 915b may also reside in the processor 917. Instructions 913b and/or data 915b loaded into the processor 917 may also include instructions 913a and/or data 915a from memory 911 that were loaded for execution or processing by the processor 917. The instructions 913b may be executed by the processor 917 to implement the systems and methods disclosed herein. For example, the instructions 913b may be executable to perform one or more of the methods 200, 300, 400, 500 described above.

The receiving electronic device 902 may include one or more communication interfaces 919 for communicating with other electronic devices (e.g., a transmitting electronic device). The communication interface 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The receiving electronic device 902 may include one or more output devices 923 and one or more input devices 921. Examples of output devices 923 include a speaker, printer, etc. One type of output device that may be included in an electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 9 as the bus system 929. The receiving electronic device 902 illustrated in FIG. 9 is a functional block diagram rather than a listing of specific components.

Figure 10:
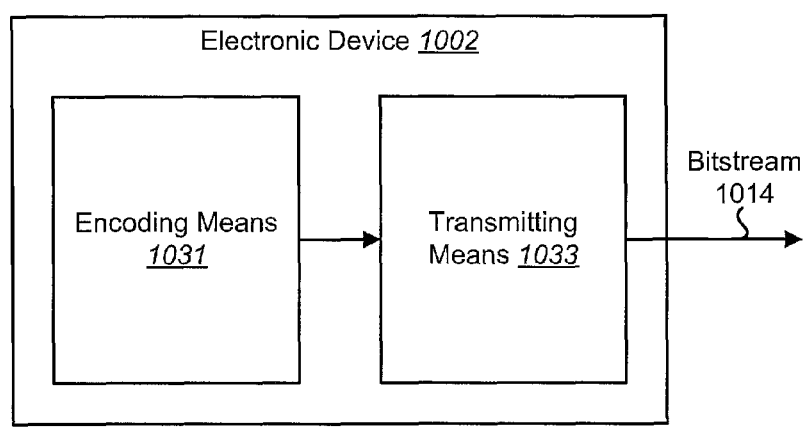
FIG. 10 is a block diagram illustrating one configuration of an electronic device in which systems and methods for sending a message may be implemented.

FIG. 10 is a block diagram illustrating one configuration of an electronic device 1002 in which systems and methods for sending a message may be implemented. The electronic device 1002 includes encoding means 1031 and transmitting means 1033. The encoding means 1031 and transmitting means 1033 may be configured to perform one or more of the functions described in connection with one or more of FIG. 1, FIG. 2, FIG. 3, FIG. 6 and FIG. 8 above. For example, the encoding means 1031 and transmitting means 1033 may generate a bitstream 1014. FIG. 8 above illustrates one example of a concrete apparatus structure of FIG. 10. Other various structures may be implemented to realize one or more of the functions of FIG. 1, FIG. 2, FIG. 3, FIG. 6 and FIG. 8. For example, a DSP may be realized by software.

Figure 11:
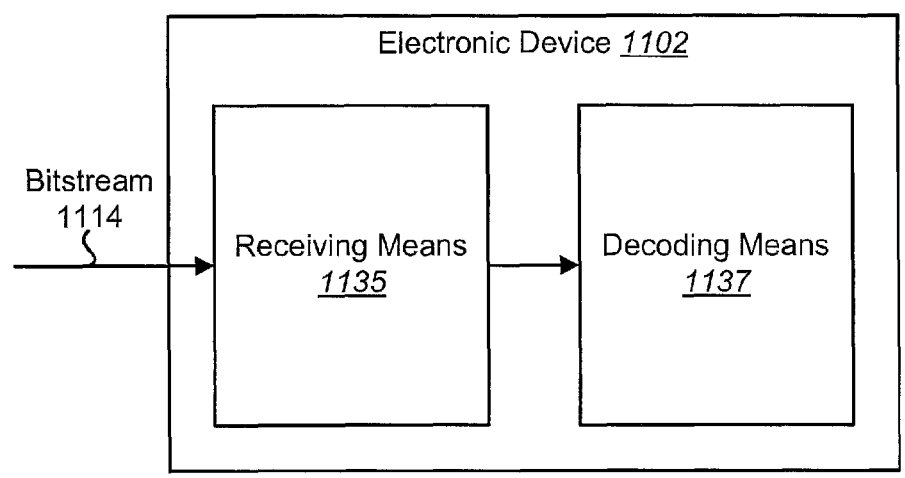
FIG. 11 is a block diagram illustrating one configuration of an electronic device in which systems and methods for buffering a bitstream may be implemented.

FIG. 11 is a block diagram illustrating one configuration of an electronic device 1102 in which systems and methods for buffering a bitstream 1114 may be implemented. The electronic device 1102 may include receiving means 1135 and decoding means 1137. The receiving means 1135 and decoding means 1137 may be configured to perform one or more of the functions described in connection with one or more of FIG. 1, FIG. 4, FIG. 5, FIG. 7 and FIG. 9 above. For example, the receiving means 1135 and decoding means 1137 may receive a bitstream 1114. FIG. 9 above illustrates one example of a concrete apparatus structure of FIG. 11. Other various structures may be implemented to realize one or more functions of FIG. 1, FIG. 4, FIG. 5, FIG. 7 and FIG. 9. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray(registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. An electronic device for buffering a bitstream, comprising:
   determining a picture timing SEI (Supplemental Enhancement Information) message to remove data;
   determining an access unit CPB (Coded Picture Buffer) removal delay value, based on an access unit CPB removal delay parameter, for removing an access unit from the CPB in the picture timing SEI message, wherein the access unit is a set of Network Access Layer (NAL) units that contains exactly one coded picture; and
   determining a CPB removal delay value for each decoding unit in the access unit, based on each decoding unit CPB removal delay parameter, wherein if a flag is equal to a first value, the decoding unit is an access unit, otherwise the decoding unit is a subset of an access unit;
   wherein the each decoding unit CPB removal delays is multiplied by a sub-picture clock tick;
   wherein the sum of the CPB removal delay value of each of the decoding units in the access unit, is constrained to be equal the CPB removal delay value signaled in the access unit CPB removal delay parameter.

2. The electronic device of claim 1, wherein the access unit CPB removal delay parameter is determined based on at least an access unit delay parameter and a clock tick parameter.

3. The electronic device of claim 1, wherein the sub-picture clock tick parameter is a time units of a clock operating at the frequency time_scale Hz and time scale is the number of time units that pass in one second.

4. The electronic device of claim 1, wherein the access unit CPB removal delay parameter is determined in case of the picture timing SEI message supports operation on a sub-picture level.

* * * * *

UNITED STATES PATENT AND TRADEMARK OFFICE
CERTIFICATE OF CORRECTION

PATENT NO.         : 10,051,311 B2
APPLICATION NO.    : 14/411822
DATED              : August 14, 2018
INVENTOR(S)        : Sachin G. Deshpande Page 1 of 1

It is certified that error appears in the above-identified patent and that said Letters Patent is hereby corrected as shown below:

In the Claims

Please amend Column 37, Line 29, through Column 38, Line 18, as follows:
1. An electronic device for buffering a bitstream, comprising:
　　determining a picture timing SEI (Supplemental Enhancement Information) message to remove data;
　　determining an access unit CPB (Coded Picture Buffer) removal delay value, based on an access unit CPB removal delay parameter in the picture timing SEI message, for removing an access unit from the CPB, wherein the access unit is a set of Network Access Layer (NAL) units that contains exactly one coded picture; and
　　determining a CPB removal delay value for each decoding unit in the access unit, based on each decoding unit CPB removal delay parameter, wherein if a flag is equal to a first value, the decoding unit is an access unit, otherwise the decoding unit is a subset of an access unit;
　　wherein each CPB removal delay value for each decoding unit is multiplied by a sub-picture clock tick;
　　wherein the sum of the CPB removal delay value for each decoding unit in the access unit, is constrained to be equal to the CPB removal delay value signaled in the access unit CPB removal delay parameter.

Signed and Sealed this
　　　　　　　　　　Twenty-first Day of January, 2020

Andrei Iancu
*Director of the United States Patent and Trademark Office*